United States Patent
Nagata et al.

(10) Patent No.: US 12,214,430 B2
(45) Date of Patent: Feb. 4, 2025

(54) MILLING TOOL AND WORKPIECE MACHINING METHOD

(71) Applicant: MAKINO MILLING MACHINE CO., LTD., Tokyo (JP)

(72) Inventors: Fukuhito Nagata, Fujiyoshidai (JP); Ryoichi Miyamoto, Fujiyoshidai (JP); Hiroshi Ueno, Fujiyoshidai (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 578 days.

(21) Appl. No.: 17/606,526

(22) PCT Filed: Apr. 22, 2020

(86) PCT No.: PCT/JP2020/017330
§ 371 (c)(1),
(2) Date: Oct. 26, 2021

(87) PCT Pub. No.: WO2020/218333
PCT Pub. Date: Oct. 29, 2020

(65) Prior Publication Data
US 2022/0203462 A1 Jun. 30, 2022

(30) Foreign Application Priority Data
Apr. 26, 2019 (JP) .................... 2019-086565

(51) Int. Cl.
*B23C 5/10* (2006.01)
(52) U.S. Cl.
CPC .......... *B23C 5/109* (2013.01); *B23C 2265/08* (2013.01)
(58) Field of Classification Search
CPC ....... B23C 5/109; B23C 2220/04; B23C 3/10; B23C 2240/08; B23C 2265/08; B23C 5/1081
See application file for complete search history.

(56) References Cited

U.S. PATENT DOCUMENTS 1,499,818 A * 7/1924 Franconetti ............... B23C 5/12
29/10
3,283,663 A * 11/1966 Davis ........................ B23C 3/28
D8/62
(Continued)

FOREIGN PATENT DOCUMENTS

CN 206882872 U 1/2018
DE 10349334 A1 * 6/2005 ............ B23C 5/109
(Continued)

OTHER PUBLICATIONS

International Search Report for PCT/JP2020/017330 (Jun. 23, 2020).

*Primary Examiner* — Sara Addisu
(74) *Attorney, Agent, or Firm* — Merchant & Gould P.C.

(57) ABSTRACT

A milling tool includes a shank section and a head, the head provided on a tip end side of the shank section and having cutting edges. The head includes an expanding diameter section and a contracting diameter section, the expanding diameter section gradually increasing in diameter as it spans toward the tip end from a base end portion adjoining the shank section, and the contracting diameter section gradually decreasing in diameter as it spans toward the tip end from a maximum diameter section. At least one cutting edge is provided on each of the expanding diameter section and the contracting diameter section. At least one tip-end cutting edge that extends from the contracting diameter section to a center axis of the milling tool is provided on a tip end portion of the head.

3 Claims, 36 Drawing Sheets

(56) References Cited

U.S. PATENT DOCUMENTS

| | | | | |
|---|---|---|---|---|
| 4,032,251 | A * | 6/1977 | Ribich | B23B 51/10 408/199 |
| 4,197,042 | A * | 4/1980 | Krhounek | B23B 27/1622 407/104 |
| 4,293,254 | A * | 10/1981 | Markovics | B23B 51/10 408/229 |
| 4,527,643 | A * | 7/1985 | Horton | E21B 10/58 175/420.2 |
| 4,591,302 | A * | 5/1986 | Lovendahl | B23B 51/10 407/104 |
| 4,799,834 | A * | 1/1989 | Wells | B23B 51/107 407/42 |
| 4,988,241 | A * | 1/1991 | Colligan | B23C 5/04 407/62 |
| 5,259,707 | A * | 11/1993 | Keller | B23B 51/00 408/233 |
| 5,478,178 | A * | 12/1995 | Pawlick | B23C 5/202 408/153 |
| 5,647,699 | A * | 7/1997 | Martin | B27G 13/10 407/50 |
| 5,765,973 | A * | 6/1998 | Hirsch | B23B 51/10 408/199 |
| 6,095,723 | A * | 8/2000 | Reynolds | B23C 5/10 407/65 |
| 6,220,795 | B1 * | 4/2001 | Matthews | B23B 51/10 408/233 |
| 7,287,937 | B2 * | 10/2007 | Chang | B23B 51/10 407/54 |
| 8,348,557 | B2 * | 1/2013 | Schneider | B23C 5/10 407/56 |
| 8,961,077 | B2 * | 2/2015 | Swiatowy | B23C 3/007 407/53 |
| 11,628,506 | B2 * | 4/2023 | Haertel | B23C 5/08 407/62 |
| 11,691,207 | B2 * | 7/2023 | Schmida | B23C 5/1018 407/53 |
| 11,731,204 | B2 * | 8/2023 | Hecht | B23C 5/2213 407/53 |
| 2003/0072625 | A1 * | 4/2003 | Morgulis | B23C 5/2213 407/113 |
| 2004/0005199 | A1 * | 1/2004 | Janness | B23C 5/109 407/35 |
| 2006/0029474 | A1 * | 2/2006 | Chang | B23B 51/0063 407/48 |
| 2008/0298917 | A1 * | 12/2008 | Chang | B23C 5/202 408/226 |
| 2011/0027025 | A1 * | 2/2011 | Horiike | B23C 5/109 407/115 |
| 2011/0097163 | A1 * | 4/2011 | Swiatowy | B23C 3/007 407/42 |
| 2012/0230790 | A1 * | 9/2012 | Uno | B23C 5/2208 408/227 |
| 2015/0298225 | A1 * | 10/2015 | Ueno | B64C 1/12 407/56 |
| 2019/0160558 | A1 * | 5/2019 | Hecht | B23C 5/006 |
| 2019/0210123 | A1 | 7/2019 | Kobayashi | |
| 2020/0070258 | A1 * | 3/2020 | Kress | B24B 3/06 |
| 2021/0078086 | A1 * | 3/2021 | Ueno | B23C 5/1081 |
| 2021/0078087 | A1 * | 3/2021 | Ehrler | B23C 5/10 |
| 2021/0138564 | A1 * | 5/2021 | Schmida | B23C 5/1081 |
| 2021/0162518 | A1 * | 6/2021 | Nishio | F16C 33/10 |
| 2021/0205902 | A1 * | 7/2021 | Hayakawa | B23C 5/22 |
| 2022/0023955 | A1 * | 1/2022 | Hecht | B23B 27/145 |
| 2022/0118531 | A1 * | 4/2022 | Hecht | B23C 5/109 |

FOREIGN PATENT DOCUMENTS

| | | | | |
|---|---|---|---|---|
| DE | 102008056682 A1 * | 3/2010 | | B23B 31/083 |
| DE | 102009012670 A1 * | 9/2010 | | B23C 5/10 |
| DE | 102010005580 A1 * | 7/2011 | | B23B 51/0081 |
| DE | 102018119927 A1 * | 2/2020 | | B23C 5/10 |
| DE | 102019202458 A1 * | 8/2020 | | B23C 3/058 |
| EP | 264673 A * | 4/1988 | | B23C 3/00 |
| EP | 620070 A1 * | 10/1994 | | B23C 5/1027 |
| EP | 3031557 A1 * | 6/2016 | | B23B 51/102 |
| FR | 2967086 A1 * | 5/2012 | | B23B 35/00 |
| JP | S62-95812 U | 6/1987 | | |
| JP | H2-150111 U | 12/1990 | | |
| JP | H4-300107 A | 10/1992 | | |
| JP | 11320232 A * | 11/1999 | | |
| JP | H11-320232 A | 11/1999 | | |
| JP | 2000288823 A * | 10/2000 | | B23C 5/109 |
| JP | 2001062622 A * | 3/2001 | | B23C 5/10 |
| JP | 2016112634 A * | 6/2016 | | B23B 51/102 |
| JP | 2016129932 A | 7/2016 | | |
| WO | WO-2010057993 A1 * | 5/2010 | | B23C 5/109 |
| WO | WO-2011107594 A1 * | 9/2011 | | B23C 5/06 |
| WO | 2014/068710 A1 | 5/2014 | | |
| WO | WO-2014178355 A1 * | 11/2014 | | B23C 3/122 |
| WO | 2018/037804 A1 | 3/2018 | | |

* cited by examiner

MILLING TOOL AND WORKPIECE MACHINING METHOD

This application is a National Stage Application of PCT/JP2020/017330 filed Apr. 22, 2020, which claims benefit of priority to Japanese Patent Application No. 2019-086565, filed Apr. 26, 2019, which applications are incorporated herein by reference. To the extent appropriate, a claim of priority is made to each of the above disclosed applications.

FIELD

The present invention relates to a milling tool which is capable of machining an undercut section such as a rib having a return flange with high efficiency and high accuracy, and a workpiece machining method.

BACKGROUND

Patent Literature 1 describes a T-shaped cutter for forming an undercut in a workpiece side surface. The T-shaped cutter has a head which is joined to one end of a shank, a plurality of bottom edge parts which have cutting edges on a distal end side of the head and a plurality of upper edge parts which have cutting edges on a proximal end side are alternately arranged in a peripheral direction, and the cutting edges of the bottom edge parts and the top edge parts are formed integral with the shank and the head.

CITATION LIST

Patent Literature

[PTL 1] WO 2014/068710

SUMMARY

Technical Problem

In the T-shaped cutter of Patent Literature 1, since the bottom edge parts, the upper edge parts, the shank, and the head are integrally formed, the cutter has a high rigidity, and accordingly, undercut machining can be performed with high efficiency. However, the higher the rib height, the greater the necessary length of the shank, and there is a problem that a large lateral force (bending stress) acts on the shank, deforming the shank, which reduces machining speed and machining accuracy.

The present invention aims to solve such problems of the prior art and to provide a milling tool and a workpiece machining method with which an undercut section such as a rib having a return flange can be machined high efficiency and high accuracy.

Solution to Problem

In order to achieve the object described above, according to the present invention, there is provided a milling tool comprising a shank section and a head which is provided on a tip end side of the shank section and which has a cutting edge, wherein the head has an expanding diameter section which gradually increases in diameter from a base end portion adjoining the shank section in a tip end direction, and a contracting diameter section which gradually decreases in diameter from a maximum diameter section in the tip end direction, and the milling tool comprises at least one cutting edge provided on the expanding diameter section and at least one cutting edge provided the contracting diameter section, and at least one tip end cutting edge which extends from the contracting diameter section to a center axis of the milling tool in a tip end section of the head.

Furthermore, according to the present invention, there is provided a workpiece machining method for undercutting inner portions of a rib and a return flange connected thereto, of a workpiece affixed to a table of a machine tool, the method comprising the steps of attaching the milling tool according to claim 1 to a spindle of the machine tool and rotating, machining an inside of the return flange with a cutting edge of the expanding diameter section of the milling tool, and machining a side surface of the rib and a corner between the inside of the return flange and the side surface of the rib with a cutting edge of the contracting diameter section of the milling tool and a tip end cutting edge.

Advantageous Effects of Invention

According to the present invention, since the head of the milling tool has an expanding diameter section which gradually increases in diameter from a base end portion in a tip end direction, and a contracting diameter section which gradually decreases in diameter from a maximum diameter section in the tip end direction, and cutting edges are provided on the expanding diameter section and the contracting diameter section, by moving the milling tool diagonally toward the undercut section of the workpiece, it is possible to machine the workpiece without interfering with the return flange, whereby the protrusion length of the shank can be shortened. Thus, the undercut section can be machined efficiently, with high precision and high quality under high machining conditions. Furthermore, the tip end cutting edge extending to the center axis of the milling tool enables machining of corners between the inside of the return flange and the side surface of the rib with one tool, reducing the machining time of the workpiece.

Furthermore, since the at least one tip end cutting edge extends from the contracting diameter section to the center axis of the milling tool in the tip end section of the head, corner machining between the bottom wall and the rib and corner machining between the rib and the return flange can be performed at the same time as flat machining, such as the bottom wall, the rib, and the return flange, whereby the undercut section can be machined more efficiently.

DESCRIPTION OF EMBODIMENTS

Figure 1:
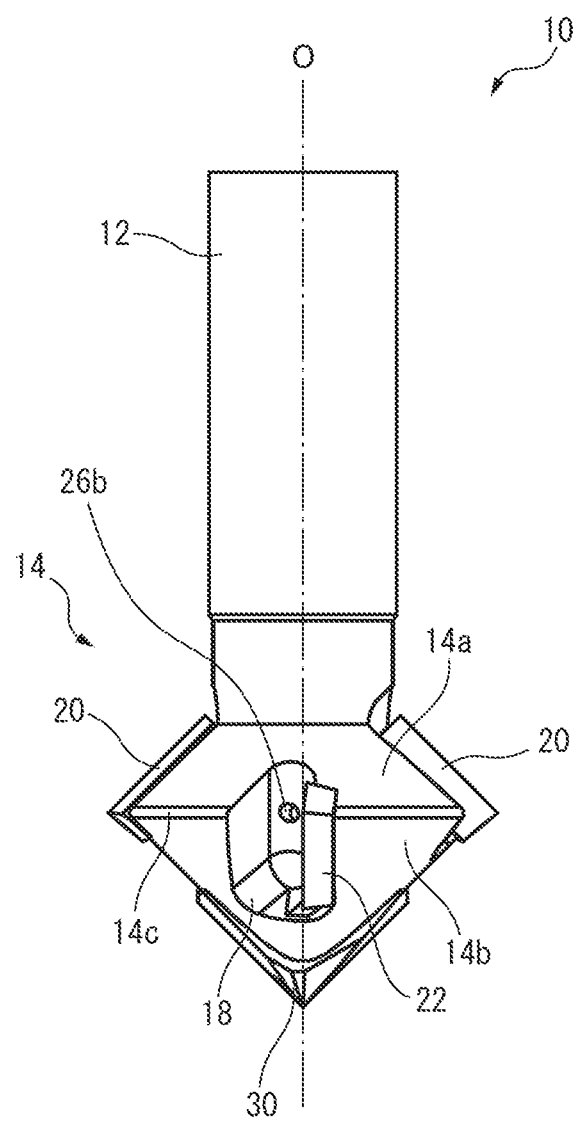
FIG. 1 is a front view of a milling tool according to a first embodiment of the present invention.
Figure 2:
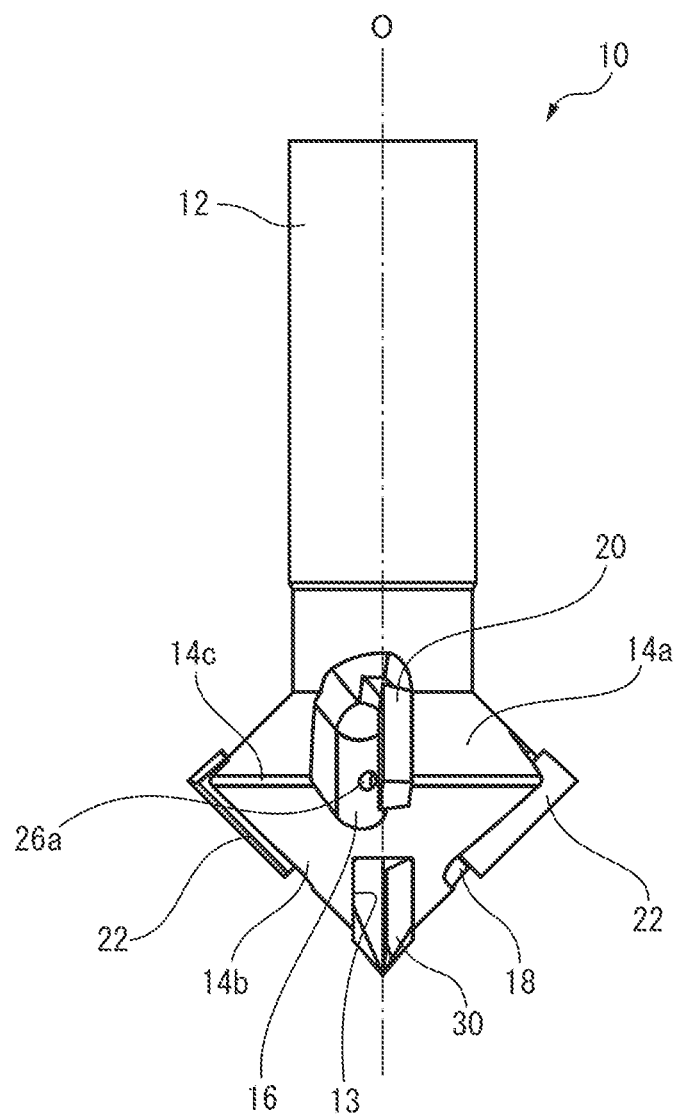
FIG. 2 is a side view of the milling tool as viewed from a direction differing by 90° from FIG. 1
Figure 3:
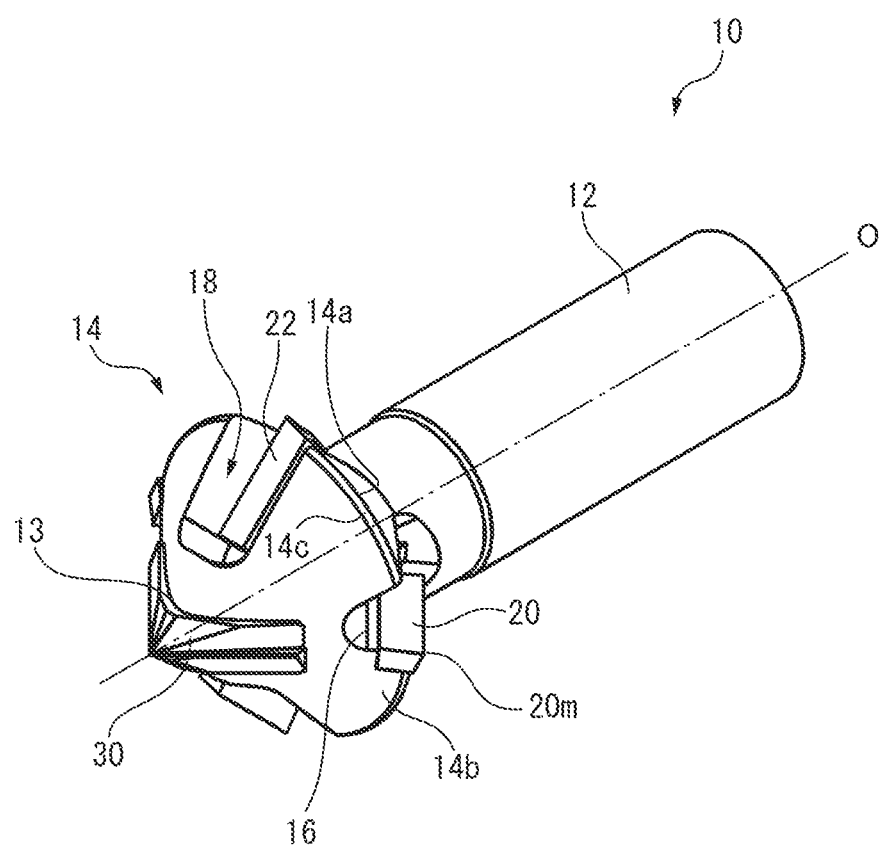
FIG. 3 is a perspective view of the milling tool of FIG. 1.

Preferred embodiments of the present invention will be described below with reference to the attached drawings.

Referring to FIGS. 1 to 15, a milling tool 10 according to a first embodiment of the milling tool of the present invention comprises a cylindrical shank 12 and a head 14 which is integrally formed on the tip end of the shank 12. The head 14 has a substantially frustoconical expanding diameter section 14a which increases in diameter from a base end side adjoining the shank 12 in the tip end direction, and a substantially frustoconical contracting diameter section 14b which decreases in diameter from the expanding diameter section 14a in the tip end direction, and the head 14 is formed in a substantially two-sided conical shape. A transition section 14c as a maximum diameter section, in which the diameter is maximum, is formed between the expanding diameter section 14a and the contracting diameter section 14b. The head 14 has upper grooves 16 formed in the expanding diameter section 14a, lower grooves 18 formed in the contracting diameter section 14b, and a tip end groove 13 for attachment of a tip end insert 30.

The upper grooves 16 and lower grooves 18 are alternately arranged at equal angles about the central axis O of the head 14. In the illustrated embodiment, the head 14 has two upper grooves 16 and two lower grooves 18. Note that though the upper grooves 16 and lower grooves 18 are arranged at equal angles in the present embodiment, they may be arranged at non-equal angles in order to prevent chatter.

An upper seat (not illustrated) for attachment of an upper insert 20 is formed in each upper groove 16, and a lower seat (not illustrated) for attachment of a lower insert 22 is formed in each lower groove 18. Though two upper inserts 20 are arranged in the expanding diameter section 14a and two lower inserts 22 are arranged in the contracting diameter section 14b in the illustrated embodiment, the number of upper inserts 20 and lower inserts 22 is not limited to two in the present invention, and it is sufficient that at least one upper insert 20 and at least one lower insert 22 be arranged. Thus, it is sufficient that each of the expanding diameter section 14a and the contracting diameter section 14b comprise at least one upper groove 16 or lower groove 18.

The upper seat is formed such that a linear first cutting edge 20c (FIGS. 6 to 10) of the upper insert 20 attached to the upper seat extends diagonally in the direction of rotation of the milling tool 10 gradually approaching the transition section 14c. The lower seat is formed so that a linear first cutting edge 22c (FIG. 11) of the lower insert 22 attached to the lower seat extends diagonally in the direction of rotation of the milling tool 10 gradually approaching the transition section 14c.

Further, a coolant passage for supplying coolant to a machining region can be formed in the milling tool 10. The coolant passage can have an inlet passage 24 which penetrates the shank 12 along the central axis O of the milling tool 10, upper radial passages 26a which penetrate the head 14 in the radial direction from the inlet passage 24 and which open into the respective upper grooves 16, and lower radial passages 26b which open into the respective lower grooves 18.

Referring to FIGS. 6 to 10, each upper insert 20 has an upper end section 20a and a lower end section 20b. The upper insert 20 is attached to the upper seat so that the lower end section 20b is arranged in the vicinity of the transition section 14c. The upper insert 20, when attached to the upper seat, has a rake face 20e which is arranged on the side opposite the upper seat and a first flank face 20d which faces the radially outer side. In this manner, when the upper insert 20 is attached to the head 14, an upper surface 20k is arranged so as to face the shank 12, a rear surface 20f on the side opposite the rake face 20e and a side surface 20g on the side opposite the first flank face 20d adjoin the head 14, and the upper insert 20 is positioned relative to the head 14 by these two surfaces.

The first cutting edge 20c, which extends substantially linearly from the upper surface 20k to a lower surface 20h, is formed by the rake face 20e and the first flank face 20d. Furthermore, the lower surface 20h is upwardly inclined from the rake face 20e side to the rear surface 20f side, and forms a second flank face of the upper insert 20, and a second cutting edge 20j which extends substantially linearly along the lower edge of the upper insert 20 is formed by the rake face 20e and the second flank face 20h.

Figure 11:
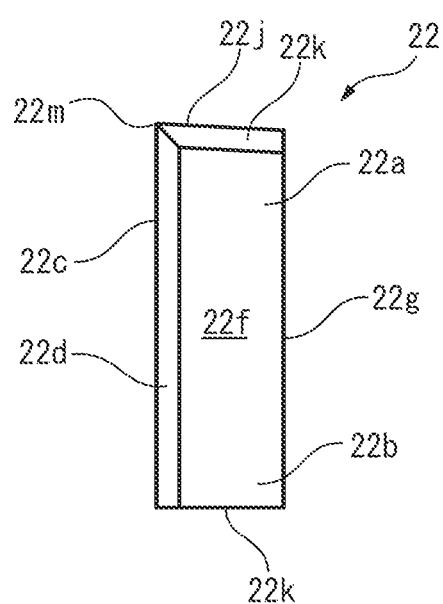
FIG. 11 is a rear view of a lower insert used in the milling tool of FIG. 1.
Figure 12:
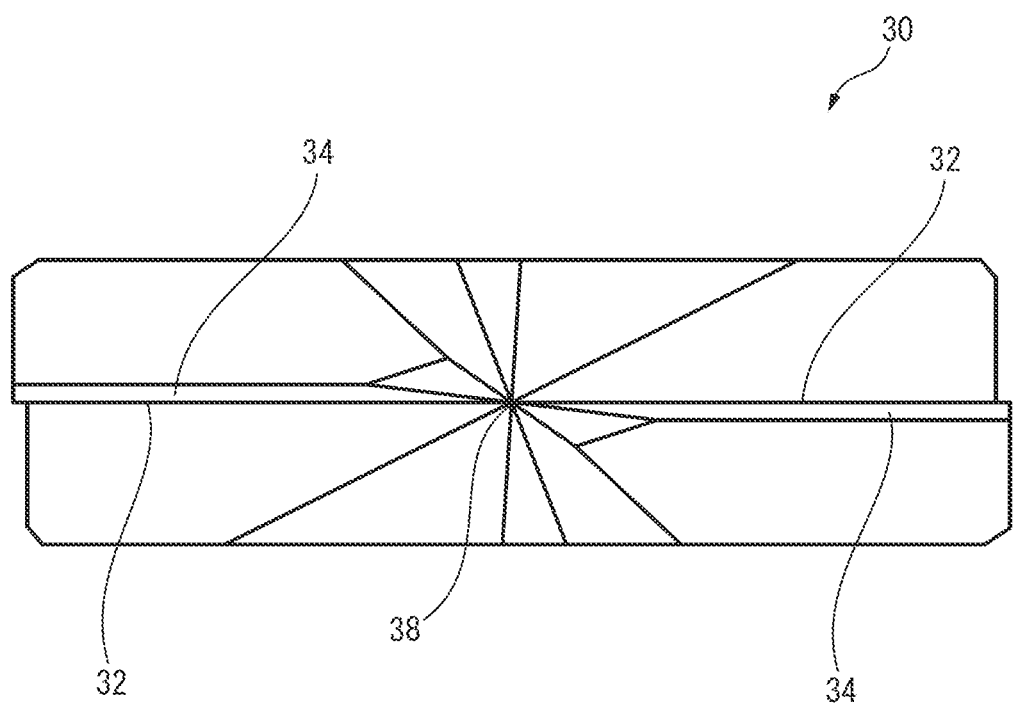
FIG. 12 is a front view of a tip end insert used in the milling tool of FIG. 1.

Referring to FIG. 11, the lower insert 22 is formed in substantially the same manner as the upper insert 20, and has an upper end section 22a and a lower end section 22b. The lower insert 22 is attached to the lower seat so that the upper end section 22a is arranged in the vicinity of the transition section 14c. Furthermore, the lower insert 22, when attached to the lower seat, has a rake face (not illustrated) which is arranged on the side opposite the lower seat, and a first flank face 22d which faces the radially outer side. In this manner, when the lower insert 22 is attached to the head 14, a lower surface 22k faces the tip end direction of the milling tool 10, and a rear surface 22f on the side opposite the rake face and a side surface 22g on the side opposite the first flank face 22d adjoin the head 14, and the lower insert 22 is positioned relative to the head 14 by these two surfaces.

A first cutting edge 22c, which extends substantially linearly from the upper surface 22h to the lower surface 22k, is formed by the rake face and the first flank face 22d. Furthermore, the upper surface 22h is downwardly inclined from the rake face side to the rear surface 22f side, and forms a second flank face of the lower insert 22, and a second cutting edge 22j which extends substantially linearly along the upper edge of the lower insert 22 is formed by the rake face and the second flank face 22h.

Figure 13:
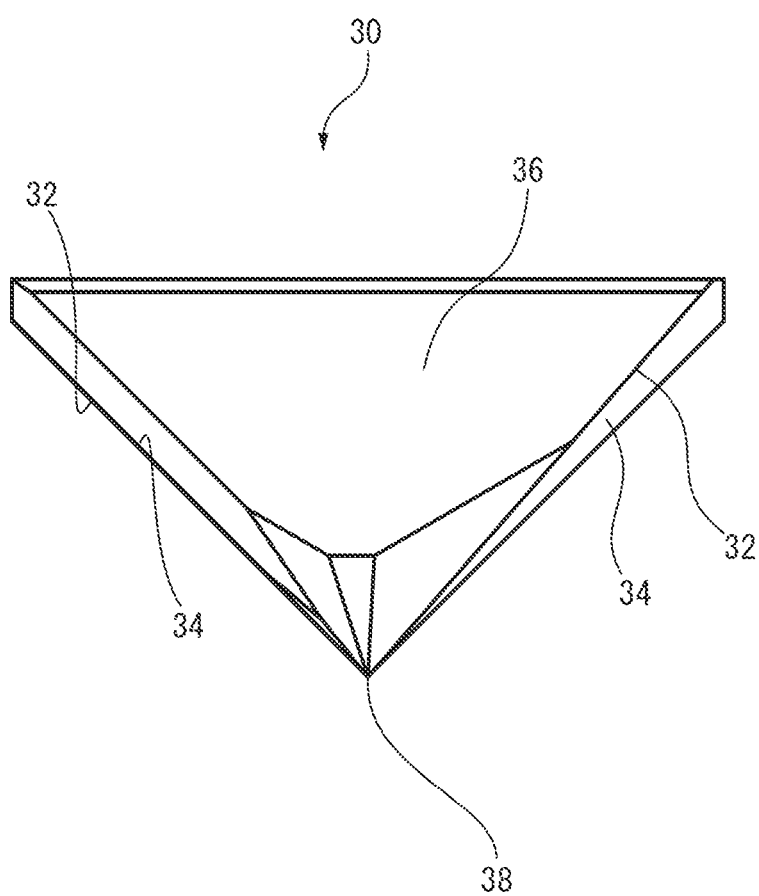
FIG. 13 is a perspective view of the tip end insert of FIG. 12 as viewed from the tip end side.
Figure 14:
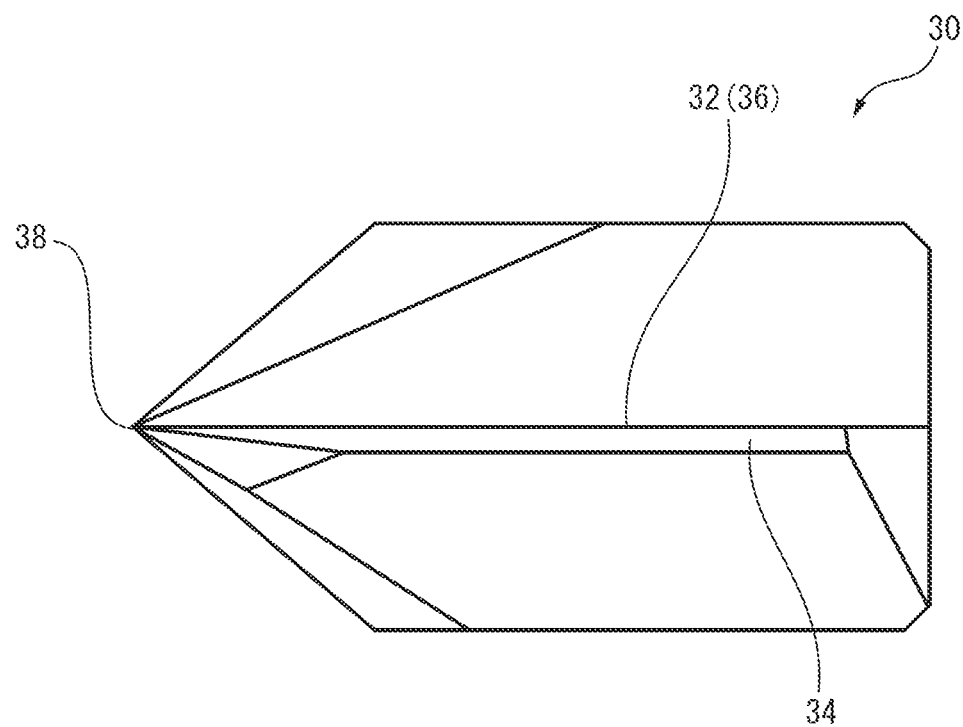
FIG. 14 is a side view of the tip end insert of FIG. 12.
Figure 15:
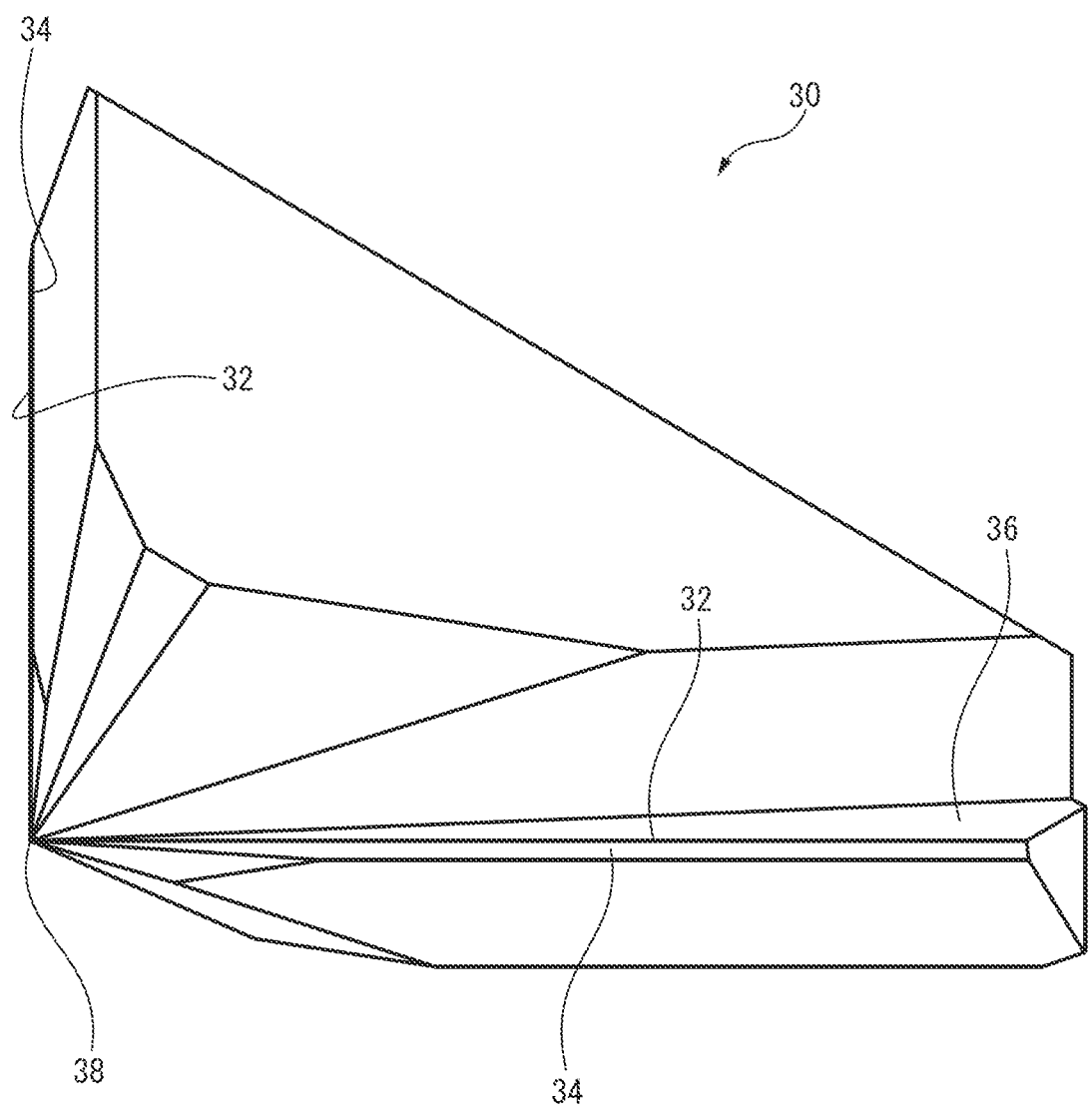
FIG. 15 is a perspective view of the tip end insert of FIG. 12 as viewed from another angle.

The tip end insert 30 is formed in a substantially triangular plate shape having a vertex 38 in a plan view (the view from the side surface of the milling tool 10 in FIG. 1), as illustrated in FIG. 13. The tip end insert 30 rotates in the direction of arrow 40 centered on the vertex 38. The tip end insert 30 has two cutting edges 32 which linearly extend from the vertex 38 along two edges of the triangular shape described above. The two cutting edges 32 are arranged on substantially the same straight line when the tip end insert 30 is viewed (in a front view) from the tip end side (the vertex 38 side). The cutting edges 32 are formed by the intersections between the rake faces 36 and the flank faces 34. When the tip end insert is viewed from the tip end side, one of the two rake faces 36 (the rake face on the right side in FIG. 12) is arranged on the upper side of the cutting edge 32 formed by the rake face, and the other rake face 36 (the rake face on the left side in FIG. 12) is arranged on the lower side of the cutting edge 32 formed by the rake face. In this manner, the two rake faces 36 are formed so as to face in the same direction relative to the direction of rotation of the milling tool 10. Furthermore, when the tip end insert is viewed from the tip end side, one of the two flank faces 34 (the flank face on the right side in FIG. 12) is arranged on the lower side of the cutting edge 32 formed by the flank face, and the other flank face 34 (the flank face on the left side in FIG. 12) is arranged on the upper side of the cutting edge 32 formed by the flank face.

In the present embodiment, the upper insert 20 and the lower insert 22 are attached to the upper seat and the lower seat respectively so that the respective first cutting edges 20c, 22c are aligned with the central axis O of the milling tool 10 in a side surface view. Further, the upper inserts 20 are attached to the upper seats so that the first cutting edges 20c of all upper inserts 20 rotate along one conical surface when the milling tool 10 rotates about the central axis O. Likewise, the lower inserts 22 are attached to the lower seats so that the first cutting edges of all lower inserts 22 rotate along one conical surface when the milling tool 10 rotates about the central axis O. Furthermore, the upper inserts 20 and the lower inserts 22 are attached to the upper seats and the lower seats respectively so that the intersections 20m, 22m of the first and second cutting edges 20c, 20j; 22c, 22j are arranged on the same circumference centered on the central axis O of the milling tool 10.

Note that the first cutting edges 20c, 22c of the upper insert 20 and the lower insert 22 may not be aligned with the central axis O of the milling tool 10 in a side surface view. For example, the upper insert 20 and the lower insert 22 may be attached to the upper seat and the lower seat such that, in a side surface view, the first cutting edge 20c of the upper insert 20 is inclined relative to the direction of rotation of the milling tool 10 so as to extend diagonally rearwardly from the intersection 20m, and the first cutting edge 22c of the lower insert 22 is inclined relative to the direction of rotation of the milling tool 10 so as to extend diagonally rearwardly from the intersection 22m. In this case, the upper insert 20 and the lower insert 22 may be attached so as to be alternatingly inclined relative to each other.

Further, in a side surface view of the milling tool 10, the first cutting edge 20c of the upper insert 20 may be inclined relative to the direction of rotation of the milling tool 10 so as to extend diagonally forward from the intersection 20m, the first cutting edge 22c of the lower insert 22 may be inclined relative to the direction of rotation of the milling tool 10 so as to extend diagonally forwardly from the intersection 22m, and the upper insert 20 and the lower insert 22 may be attached to the upper seat and the lower seat, respectively. In this case as well, the upper insert 20 and the lower insert 22 may be attached so as to be alternatingly inclined relative to each other.

Figure 4:
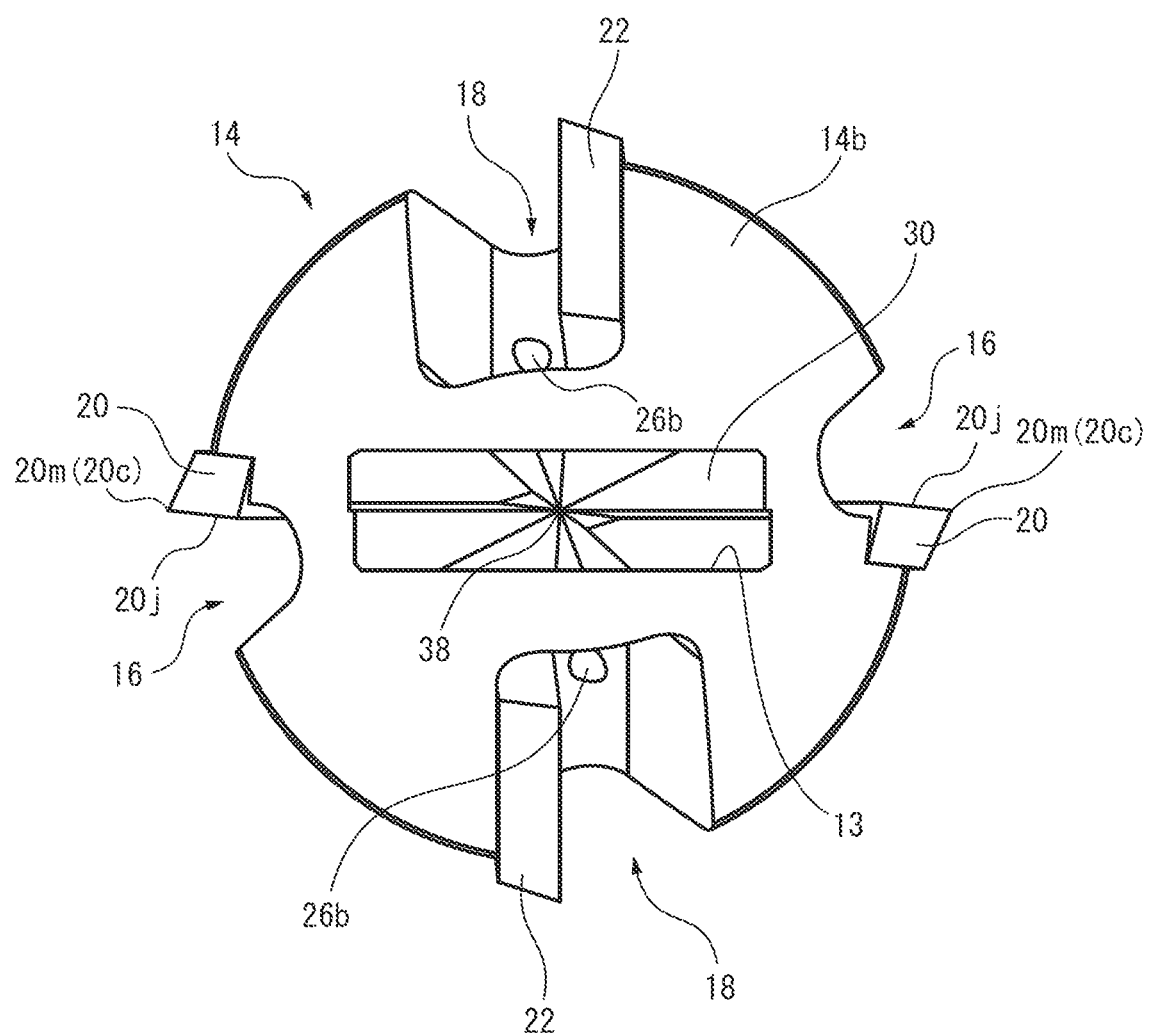
FIG. 4 is a bottom view of the milling tool of FIG. 1 as viewed from the head side.
Figure 5:
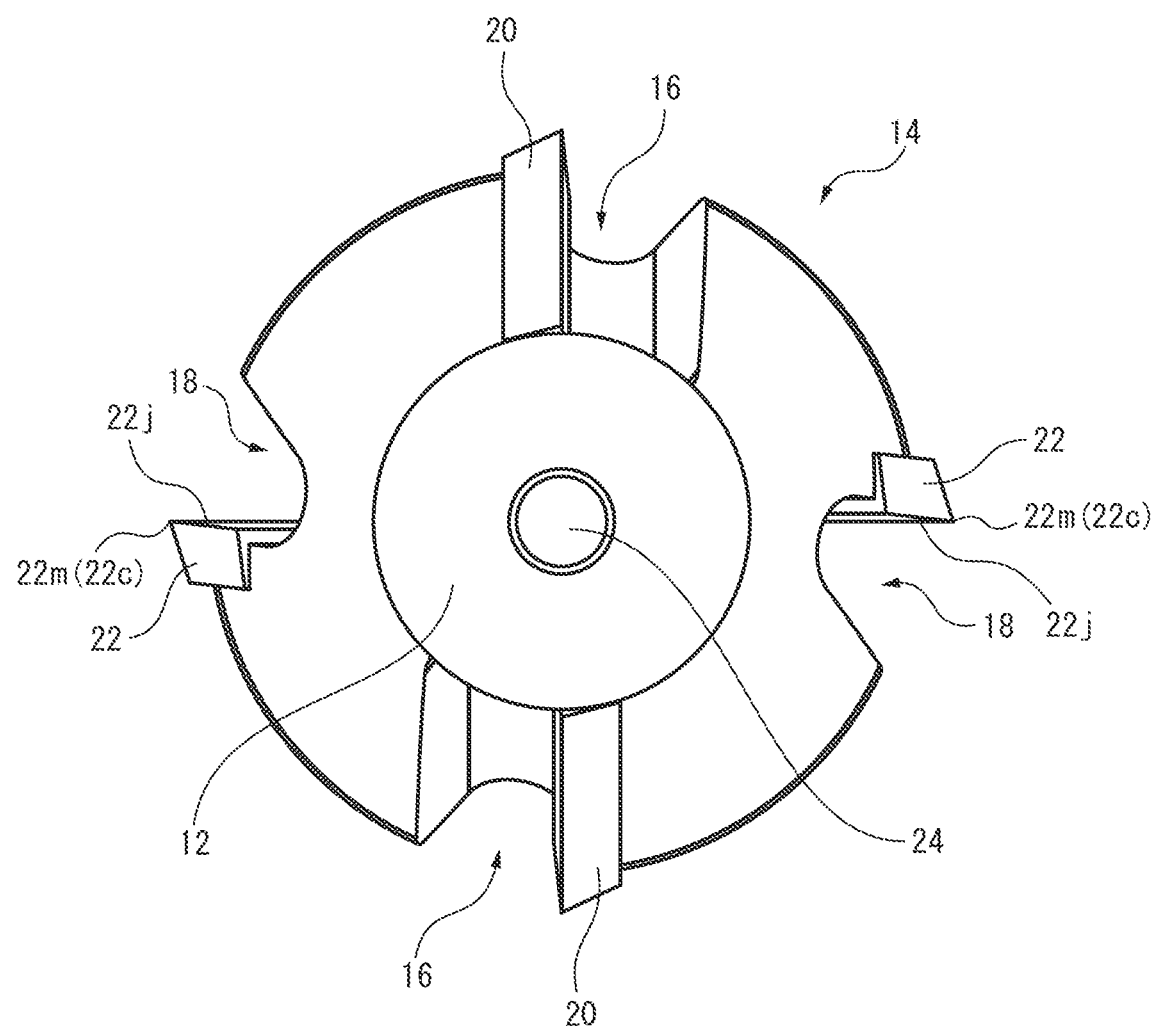
FIG. 5 is a plan view of the milling tool of FIG. 1 as viewed from the shank side.
Figure 6:
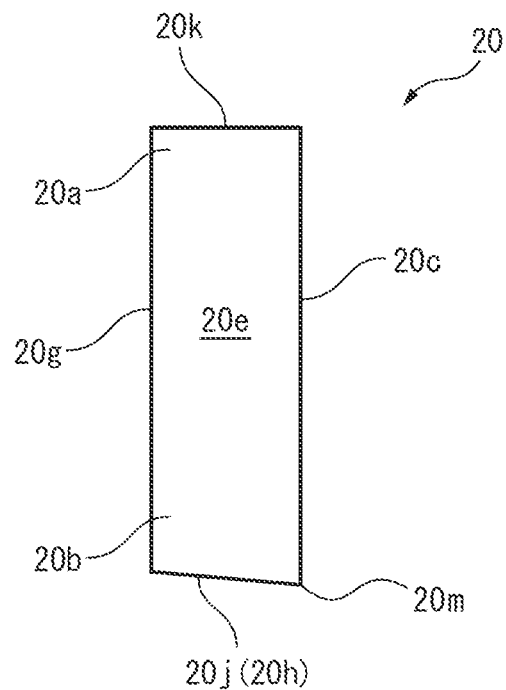
FIG. 6 is a front view of an upper insert used in the milling tool of FIG. 1.
Figure 7:
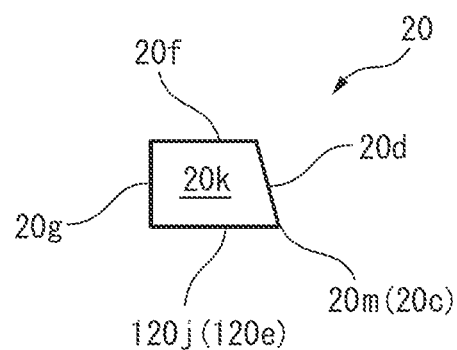
FIG. 7 is a bottom view of the upper insert of FIG. 6.
Figure 8:
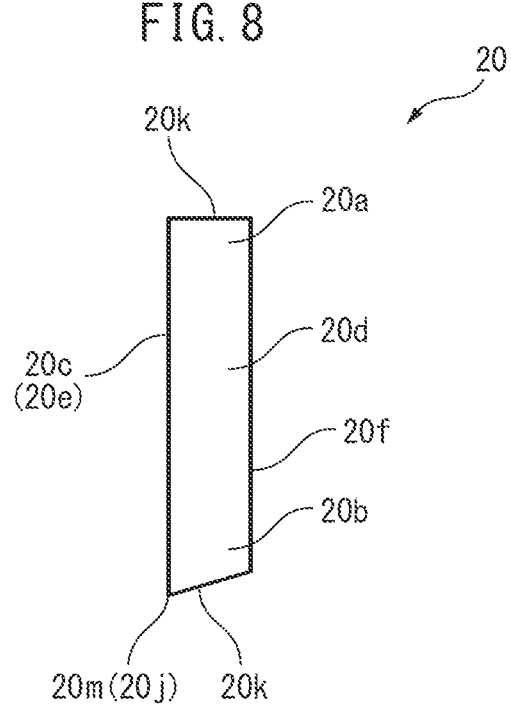
FIG. 8 is a side view of the upper insert of FIG. 6.
Figure 9:
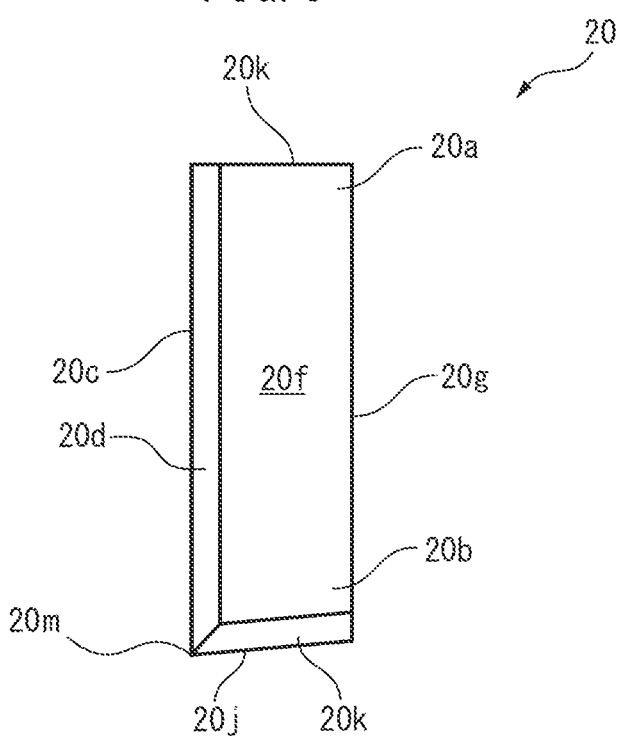
FIG. 9 is a rear view of the upper insert of FIG. 6.
Figure 10:
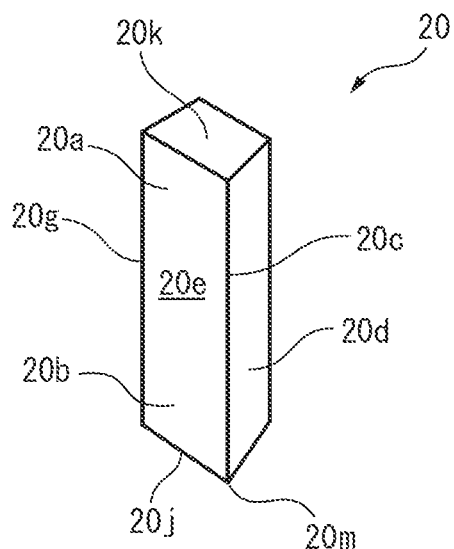
FIG. 10 is a perspective view of the upper insert of FIG. 6.

As shown in FIG. 4, the tip end insert 30 is attached in the tip end groove 13 formed in the tip end section of the head 14 so that the vertex 38 is arranged on the central axis O of the milling tool 10. Furthermore, the cutting edges 32 of the tip end insert 30 are arranged so as to be aligned with a straight line connecting the intersections 20m between the first and second cutting edges 20c, 20j of the two upper inserts 20.

Further, the two cutting edges 32 of the tip end insert 30 are attached to the tip end groove 13 of the head 14 so as to rotate along a conical surface traced by the first cutting edge of the lower insert 22 and so that the vertex 38 becomes the vertex of this conical surface when the milling tool 10 rotates about the central axis O. Specifically, the angle between the two cutting edges 32 interposing the vertex 38 of the tip end insert 30 is equal to the angle between the two generatrices where the plane containing the central axis of the conical surface (central axis O of the milling tool 10) traced by the first cutting edges 22c of the two lower inserts 22 intersects the conical surface.

In the illustrated embodiment, the two conical surfaces traced by the first cutting edges 20c, 22c of the upper insert 20 and the lower insert 22 when the milling tool 10 rotates are symmetrical with respect to the plane defined by the line of intersection between the two conical surfaces, but they may be asymmetric depending on the target machining process and workpiece shape. Furthermore, the lines of intersection (the generatrix of each conical surface) of the two conical surfaces described above with the plane containing the central axis O intersect at a predetermined angle. This angle can be any of various values depending on the target machining process. The angle formed by the two lines of intersection described above can be, for example, an angle which matches the angle between the rib, which is described later, and the return flange overhanging from the top of the rib, and is preferably an angle which is 90° or less than 90°. Furthermore, the first cutting edge 20c of the upper insert 20 is formed so as to be longer than the overhang dimension (width) of the return flange described above.

Furthermore, the shank 12 and the head 14 can be integrally formed using tool steel, and the upper insert 20, the lower insert 22, and the tip end insert 30 can be attached to the upper seat and the lower seat of the head 14 using a suitable joining technique such as brazing. The upper insert 20, the lower insert 22, and the tip end insert 30 may be affixed to the head 14 using set screws (not illustrated).

After the upper insert 20, the lower insert 22, and the tip end insert 30 have been attached, the upper insert 20, the lower insert 22, and the tip end insert 30 are subjected to grinding, so that the two first cutting edges 20c of the upper insert 20 trace the same conical surface, the two first cutting edges 22c of the lower insert 22 and the two cutting edges 32 of the tip end insert 30 trace the same conical surface, and the intersection 20m of the first and second cutting edges 20c. 20j of the upper insert 20 and the intersection 22m of the first and second cutting edges 22c, 22j of the lower insert 22 trace the same circle.

An example of a rib machining (undercutting) method using the milling tool 10 will be described below referring to FIGS. 16 to 27.

Figure 16:
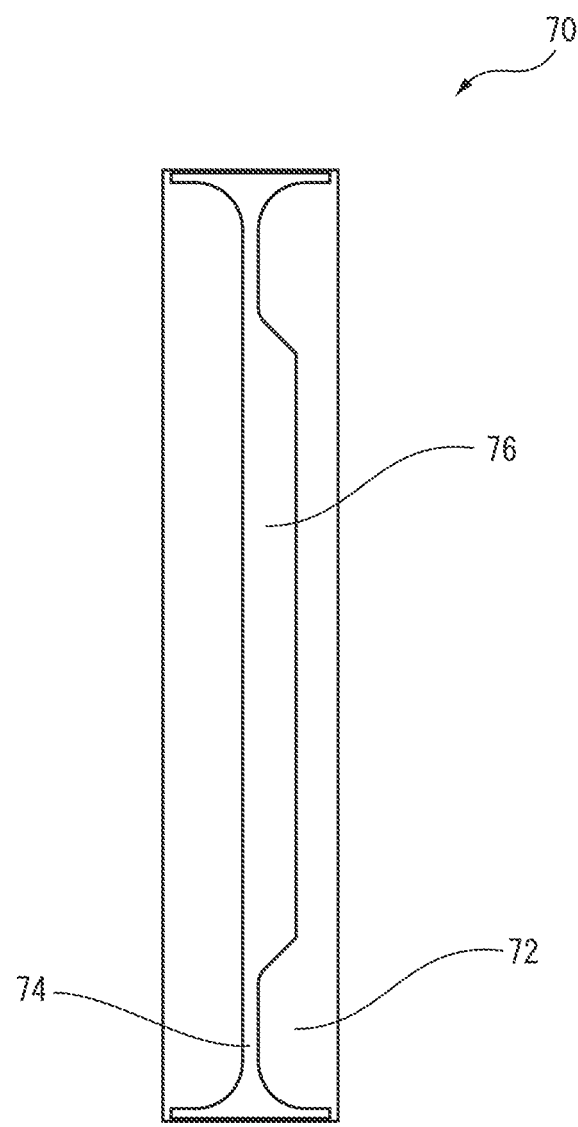
FIG. 16 is a plan view showing an example of a workpiece having a return flange to be machined with the milling tool of FIG. 1.
Figure 17:
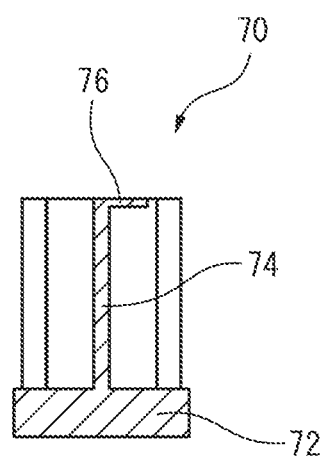
FIG. 17 is a cross-sectional view of the workpiece of FIG. 16.
Figure 18:
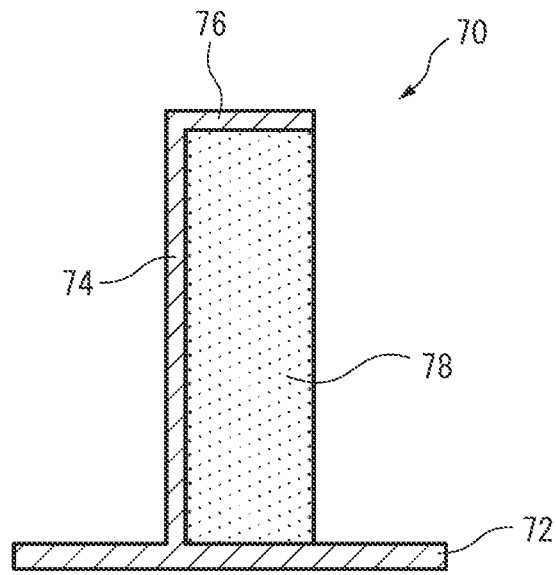
FIG. 18 is a schematic diagram detailing a method for machining a rib having a return flange.

FIGS. 16 to 18 show an example of a workpiece on which rib machining is performed. The workpiece 70, serving as the machined product, has a bottom wall 72, a rib 74 forming a thin wall extending perpendicularly from the bottom wall 72, and a return flange 76 protruding from the upper end of the rib 74 substantially in parallel to the bottom wall 72. The workpiece 70 is machined from a thick plate composed of a metal material such as an aluminum alloy by attaching the milling tool 10 to the tip end of a spindle (not illustrated) of a machine tool (not illustrated) such as, for example, a 4-axis machining center having three orthogonal linear feed axes and at least one rotational feed axis, and preferably a 5-axis machining center having three orthogonal linear feed axes and two rotational feed axes. Note that the milling tool 10 is attached to the tip end of the spindle of the machine tool via a tool holder (not illustrated). Furthermore, the workpiece 70 is affixed to a table (not illustrated) of the machine tool.

First, material is removed from the thick plate, leaving the bottom wall 72, the thin wall serving as the rib 74, the return flange 76, and the portion to be removed (hereinafter referred to as the removal region) 78 between the return flange 76 and the bottom wall 72 in accordance with the width dimension of the return flange 76, as shown in FIG. 18, using, for example, a rotary tool such as a square end mill which is capable of cutting with the side surface of the tool (FIG. 18).

Figure 19:
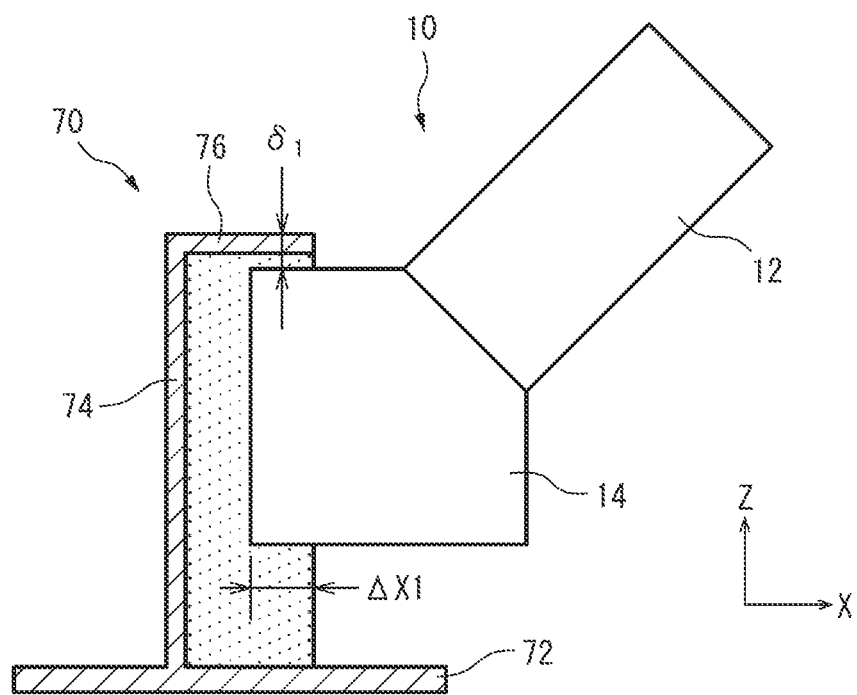
FIG. 19 is a schematic diagram detailing the method for machining the rib having a return flange.

Next, the milling tool 10, which has been positioned in the Z-axis direction so that a finishing allowance δ1 with respect to the finished surface of the return flange 76 remains and which has been positioned in the X-axis direction so that the amount cut from the surface of the removal region 78 is ΔX1, is fed in the Y-axis direction (the direction orthogonal to the sheet of the drawing), whereby a part of the removal region 78 on the lower side of the return flange 76 is removed by first rough machining (FIG. 19). This first rough machining is performed by all of the cutting edges of the upper inserts 20, the lower inserts 22, and tip end insert 30.

Figure 20:
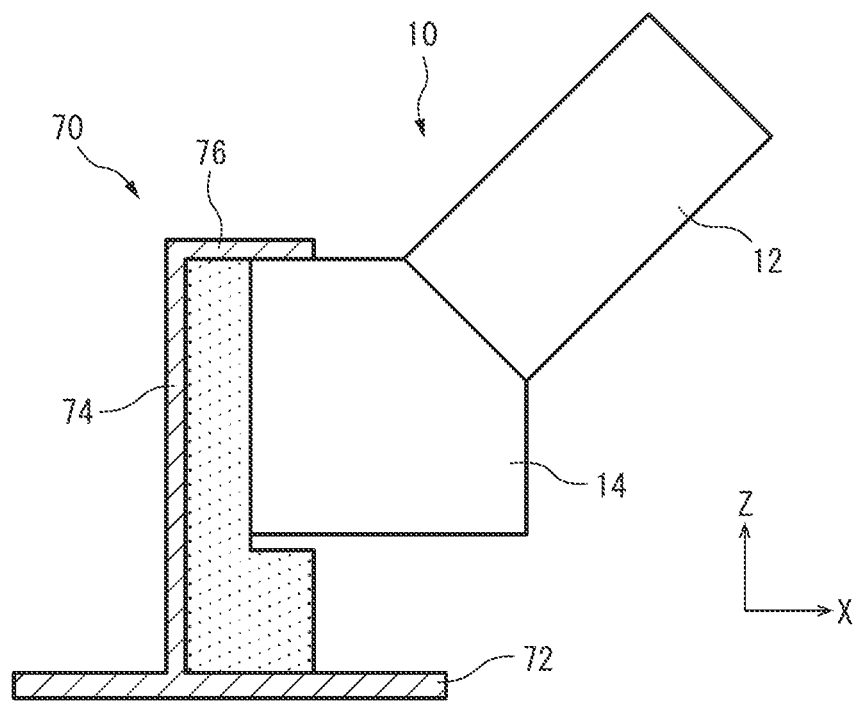
FIG. 20 is a schematic diagram detailing the method for machining the rib having a return flange.

When the milling tool 10 is fed in the Y-axis direction (the direction orthogonal to the sheet of the drawing) over the entire length of the workpiece 70 and the first rough machining is completed, without changing the inclination of the spindle, a pick feed corresponding to the finishing allowance δ1 is imparted to the spindle in the direction approaching the return flange 76 along the Z axis, and first finishing machining for removing the finishing allowance δ1 remaining on the lower surface of the return flange 76 of the workpiece 70 is executed while feeding the milling tool 10 in the Y-axis direction (FIG. 20). The finishing machining can be performed at a higher spindle rotation speed than the rough machining using the same milling tool 10 without replacing the milling tool 10. Furthermore, the first finishing machining is primarily performed by the upper inserts 20.

Figure 21:
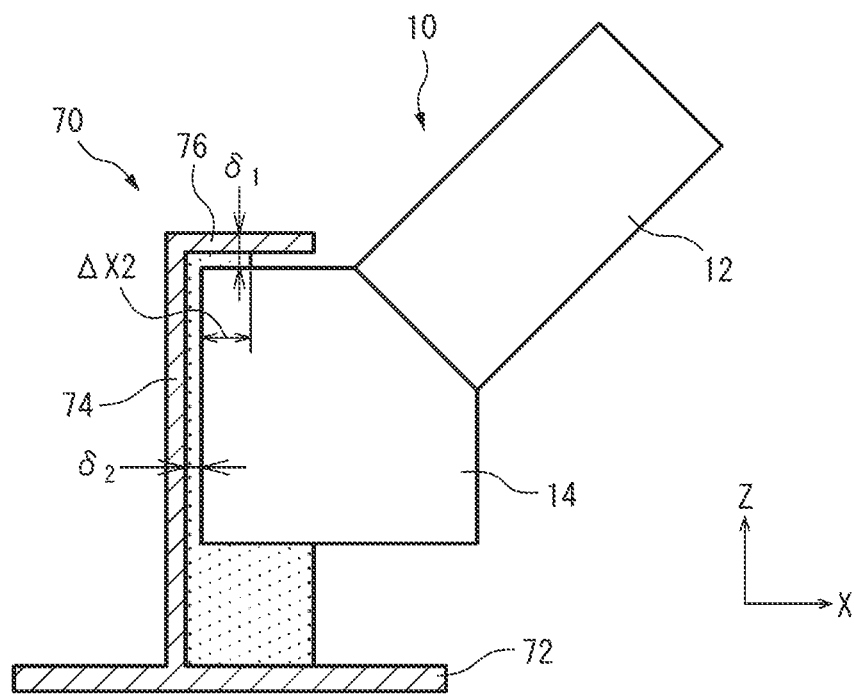
FIG. 21 is a schematic diagram detailing the method for machining the rib having a return flange.

Next, as shown in FIG. 21, the milling tool 10, which has been repositioned in the Z-axis direction so that the finishing allowance δ1 with respect to the finished surface of the return flange 76 remains and which has been imparted in the X-axis direction with a further cutting amount ΔX2, is fed in the Y-axis direction, whereby a further portion of the removal region 78 is removed by second rough machining (FIG. 21). At this time, the further cutting amount ΔX2 is determined so that a finishing allowance 62 with respect to the finished surface of the rib 74 remains. This second rough machining is performed with the upper insert 20, the lower insert 22, and the tip end insert 30.

Figure 22:
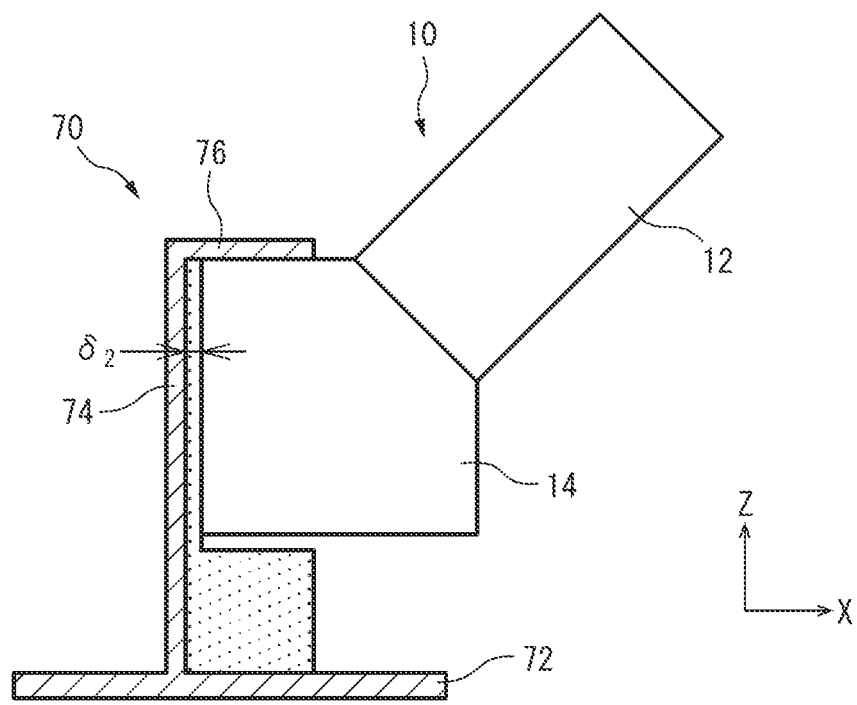
FIG. 22 is a schematic diagram detailing the method for machining the rib having a return flange.

After the second rough machining is complete, without changing the inclination of the spindle, a pick feed corresponding to the finishing allowance 61 is imparted to the spindle in the direction approaching the return flange 76 along the Z axis, and second finishing machining for removing the finishing allowance δ1 remaining on the lower surface of the return flange 76 of the workpiece 70 is executed while feeding the milling tool 10 in the Y-axis direction (FIG. 22). The second finishing machining is performed by the upper insert 20.

Figure 23:
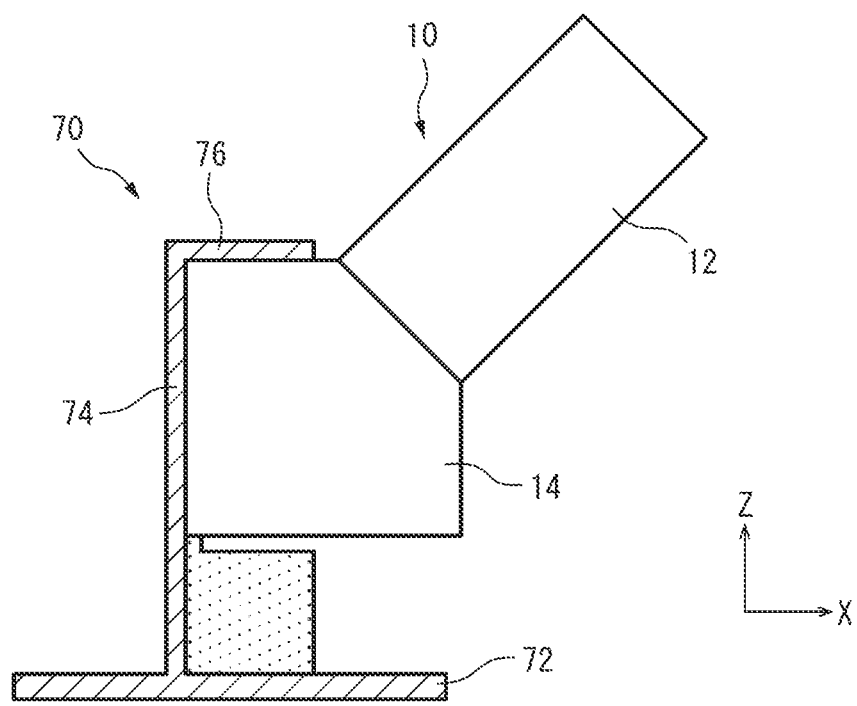
FIG. 23 is a schematic diagram detailing the method for machining the rib having a return flange.

Next, a pick feed corresponding to the finishing allowance 62 is imparted to the spindle in the direction approaching the rib 74 along the X-axis, and a third finishing machining for removing the finishing allowance δ2 remaining on the surface of the rib 74 of the workpiece 70 is executed while feeding the milling tool 10 (in the illustrated embodiment, the milling tool 10 is fed to the left) in the Y-axis direction (FIG. 23). The third finishing machining is performed by the lower inserts 22 and the tip end insert 30.

Figure 24:
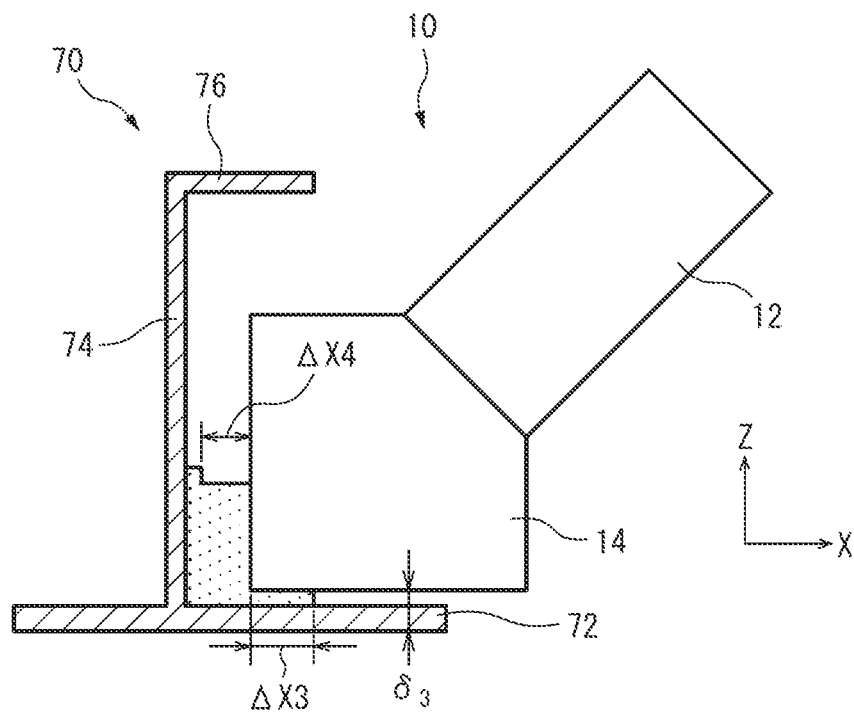
FIG. 24 is a schematic diagram detailing the method for machining the rib having a return flange.

Next, as shown in FIG. 24, the milling tool 10 is repositioned in the Z-axis direction so that a finishing allowance 53 with respect to the finished surface of the bottom wall 72 remains, a cutting amount ΔX3 is given in the X-axis direction with respect to the surface of the removal region 78, and the milling tool 10 is fed in the Y-axis direction, whereby third rough machining which further removes the removal region 78 is executed. At this time, the third rough machining is performed by the lower inserts 22 and the tip end insert 30.

Figure 25:
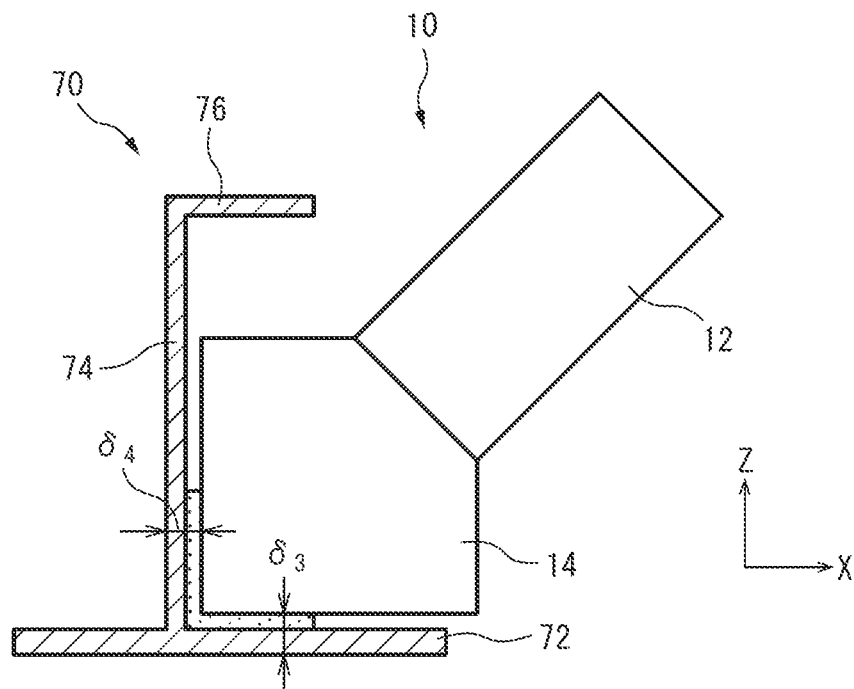
FIG. 25 is a schematic diagram detailing the method for machining the rib having a return flange.

Next, a further cutting amount ΔX4 (FIG. 24) is imparted along the X-axis and the milling tool 10 is fed in the Y-axis direction, thereby fourth rough machining which further removes the removal region 78 is executed. At this time, the fourth rough machining is performed by the lower inserts 22 and the tip end insert 30 (FIG. 25). The cutting amount ΔX4 is determined so that a finishing allowance 54 with respect to the finished surface of the rib 74 remains.

Figure 26:
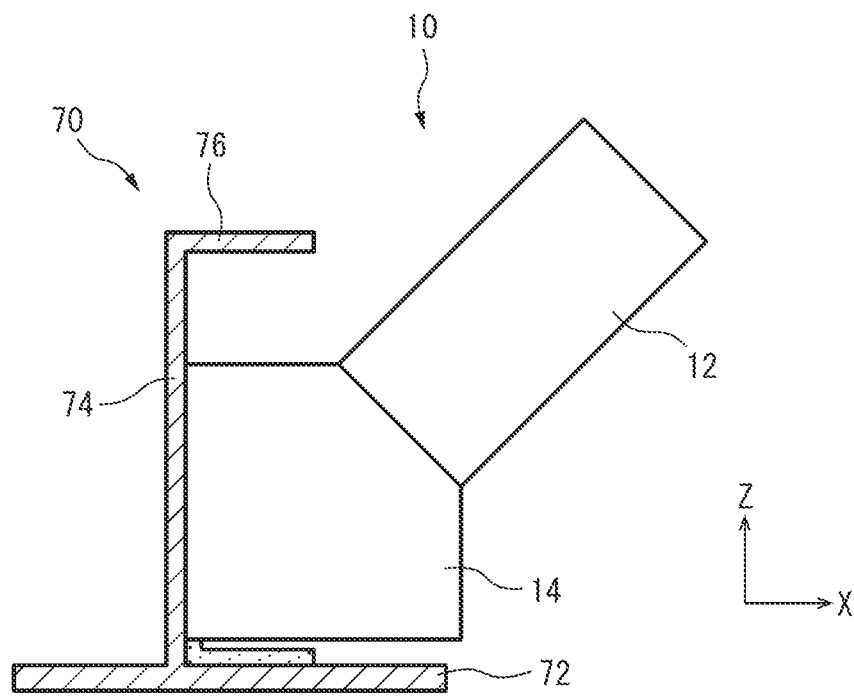
FIG. 26 is a schematic diagram detailing the method for machining the rib having a return flange.

After the fourth rough machining is complete, a pick feed corresponding to the finishing allowance δ4 is imparted to the spindle in the direction approaching the rib 74 along the X-axis, and fourth finishing machining for removing the finishing allowance δ4 remaining on the surface of the rib 74 of the workpiece 70 is executed while feeding the milling tool 10 in the Y-axis direction (FIG. 26). The fourth finishing machining is performed by the lower inserts 22 and the tip end insert 30.

Figure 27:
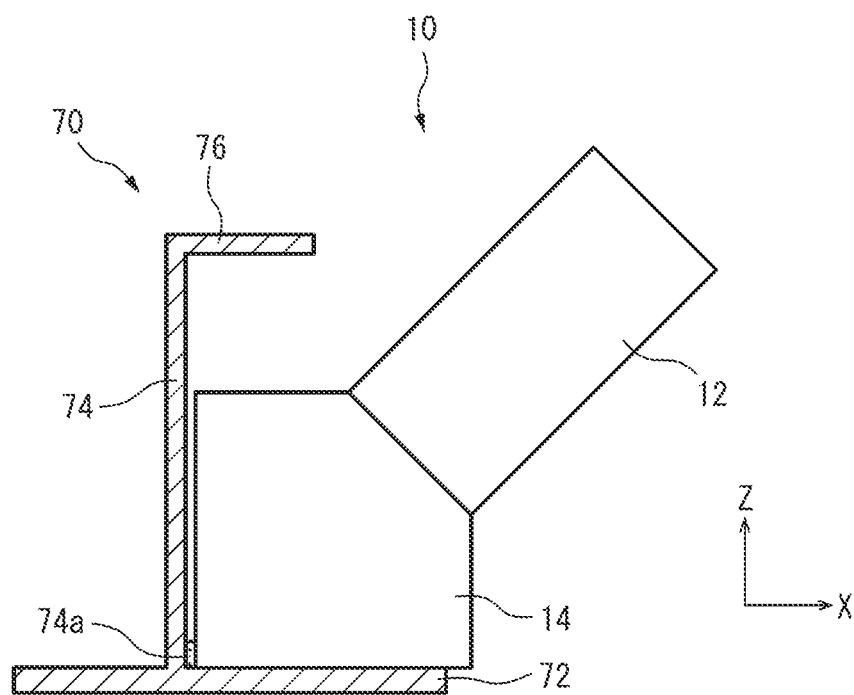
FIG. 27 is a schematic diagram detailing the method for machining the rib having a return flange.

Next, after the spindle is imparted with a pick feed corresponding to the finishing allowance 64 in the direction away from the rib 74 along the X axis, a pick feed corresponding to the finishing allowance δ3 is imparted to the spindle in the direction approaching the bottom wall 72 along the Z axis, and fifth finishing machining for removing the finishing allowance 63 remaining on the surface of the rib 74 of the workpiece 70 is executed while feeding the milling tool 10 in the Y-axis direction (FIG. 27). The fifth finishing machining is performed by the lower inserts 22 and the tip end insert 30. Finally, the portion 74a remaining in the corner between the bottom wall 72 and the rib 74 is removed by the tip end insert 30 of the milling tool 10.

In this manner, the workpiece 70 having the bottom wall 72, the rib 74 extending vertically from the bottom wall 72, and the return flange 76 protruding substantially parallel to the bottom wall 72 from the top edge of the rib 74 can be machined from a thick metal plate material such as an aluminum alloy. The workpiece 70 can be, for example, a component of an aircraft wing.

In the machining method described above, in the machining (undercutting) of the rib 74 having the return flange 76, by gradually machining the removal region 78 from the tip end side of the rib 74, the rigidity of the rib 74 is maintained to the greatest extent possible during the rib machining, and vibration of the rib 74 is prevented.

Thus, since the two cutting edges 32 of the triangular columnar tip end insert 30 are formed in a straight line and intersect at one vertex 38, the present embodiment is particularly advantageous for the machining of corners not including the corner R, such as the corner between the rib 74 and the return flange 76, or between the bottom wall 72 and the rib 74.

Furthermore, according to the present embodiment, the milling tool 10 is mounted on the spindle with a short protrusion length, whereby machining of the rib 74 having the return flange 76 can be performed. By shortening the protrusion length, the tool conventionally has high static rigidity against bending and distortion and dynamic rigidity against vibration, whereby it is possible to increase the rotational speed and feed rate of the tool. Thus, by using the milling tool 10 according to the present embodiment, it is possible to machine the workpiece 70 with higher efficiency than when a tool such as a conventional T-shaped cutter is used. Furthermore, chatter is less likely to occur, whereby machined surface quality is improved.

In the present embodiment, though the angle between the generatrix of the conical surface traced by the first cutting edge 20c of the upper insert 20 and the generatrix of the conical surface traced by the first cutting edge 22c of the lower insert 22 and the intersection angle of the finished surfaces of the rib 74 and the return flange 76 (the intersection angle of the first cutting edges of the upper insert 20 and the lower insert 22) are equal and the angle formed by the two cutting edges 32 of the tip end insert 30 (the apex angle of the tip end insert 30) is equal to the intersection angle of the finished surfaces of the bottom wall 72 and the rib 74, the present invention is not limited thereto. It is sufficient that the intersection angle of the first cutting edges of the upper insert 20 and the lower insert 22 be equal to or less than the intersection angle of the finished surfaces of the rib 74 and the return flange 76. Furthermore, it is sufficient that the apex angle of the tip end insert 30 be an angle equal to or less than the intersection angle of the finished surfaces of the bottom wall 72 and the rib 74.

A second embodiment of the present invention will be described with reference to FIGS. 28 to 40.

A milling tool 100 comprises a cylindrical shank 102 and a head 104 integrally formed on the tip end of the shank 102. The head 104 has a substantially frustoconical expanding diameter section 104a which increases in diameter from a base end side adjoining the shank 102 in the tip end direction, and a substantially frustoconical contracting diameter section 104b which decreases in diameter from the expanding diameter section 104a in the tip end direction, and the head 104 is formed in a substantially two-sided conical shape. A transition section 104c as a maximum diameter section, in which the diameter is maximum, is formed between the expanding diameter section 104a and the contracting diameter section 104b. The head 104 has upper grooves 106 formed in the expanding diameter section 104a, lower grooves 108 formed in the contracting diameter section 104b, and a tip end groove 103 for attachment of a tip end insert 50.

The upper grooves 106 and lower grooves 108 are alternately arranged at equal angles about the central axis O of the head 104. In the illustrated embodiment, the head 104 has two upper grooves 106 and two lower grooves 108. Note that though the upper grooves 106 and lower grooves 108 are arranged at equal angles in the present embodiment, they may be arranged at non-equal angles in order to prevent chatter.

An upper seat (not illustrated) is formed in each upper groove 106, and a lower seat (not illustrated) is formed in each lower groove 108. An upper insert 120 is attached to each upper seat and a lower insert 122 is attached to each lower seat. Though two upper inserts 120 are arranged in the expanding diameter section 104a and two lower inserts 122 are arranged in the contracting diameter section 104b in the illustrated embodiment, the number of upper inserts 120 and lower inserts 122 is not limited to two in the present invention, and it is sufficient that at least one upper insert 120 and at least one lower insert 122 be arranged. Thus, it is sufficient that each of the expanding diameter section 104a and the contracting diameter section 104b comprise at least one upper groove 106 or lower groove 108.

Further, a coolant passage for supplying coolant to a machining region can be formed in the milling tool 100. The coolant passage can have an inlet passage (not illustrated) which penetrates the shank 102 along the central axis O of the milling tool 100, upper radial passages 126a which penetrate the head 104 in the radial directions from the inlet passage 24 and which open into the respective upper grooves 106, and lower radial passages 126b which open into the respective lower grooves 108.

Referring to FIGS. 32 to 36, each upper insert 120 has an upper end section 120a and a lower end section 120b. The upper insert 120 is attached to the upper seat so that the lower end section 120b is arranged in the vicinity of the transition section 104c. The upper insert 120, when attached to the upper seat, has a flank face 120d which is arranged on the side opposite the upper seat.

In this manner, when the upper insert 120 is attached to the head 104, an upper surface 120k is arranged so as to face the shank 102, a rear surface 120f on the side opposite the rake face 120e and a side surface 120g on the side opposite the flank face 120d adjoin the head 104, and the upper insert 120 is positioned relative to the head 104 by these two surfaces.

A first cutting edge 120c, which extends substantially linearly from the upper end section 120a, and an arcuate second cutting edge 120j provided adjacent to the lower end section 120b and connected to the first cutting edge 120c are formed by the rake face 120e and the flank face 120d.

The lower insert 122 is formed in substantially the same manner.

Figure 29:
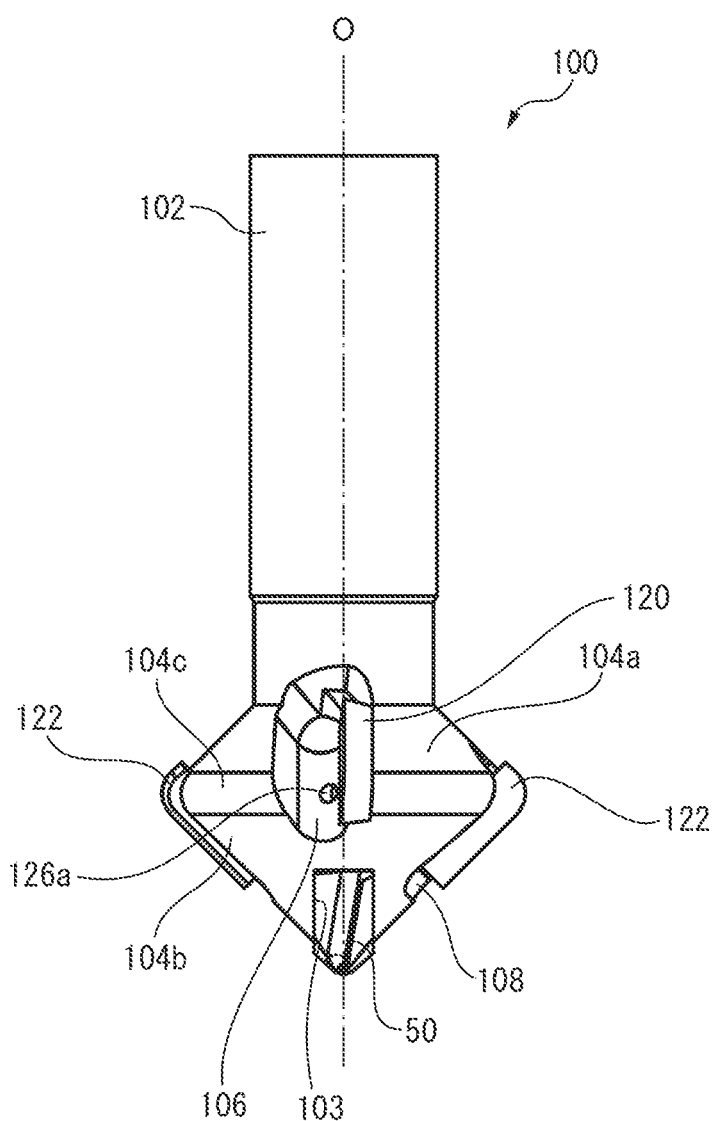
FIG. 29 is a side view of the milling tool as viewed from a direction differing by 90° from FIG. 28.
Figure 30:
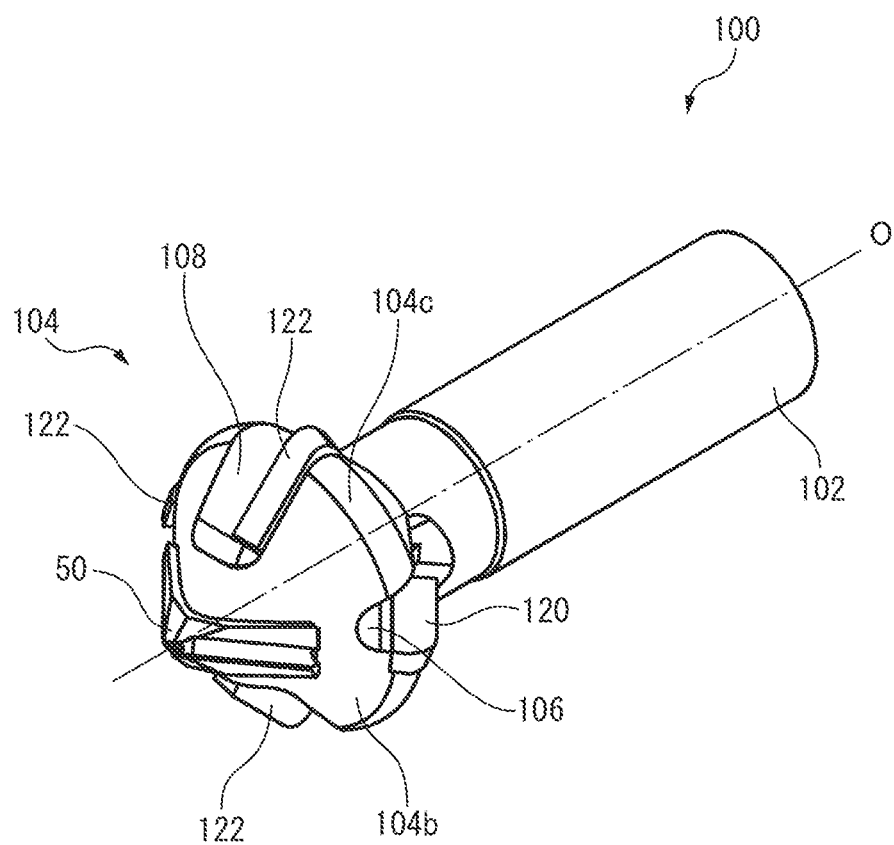
FIG. 30 is a perspective view of the milling tool of FIG. 28.
Figure 31:
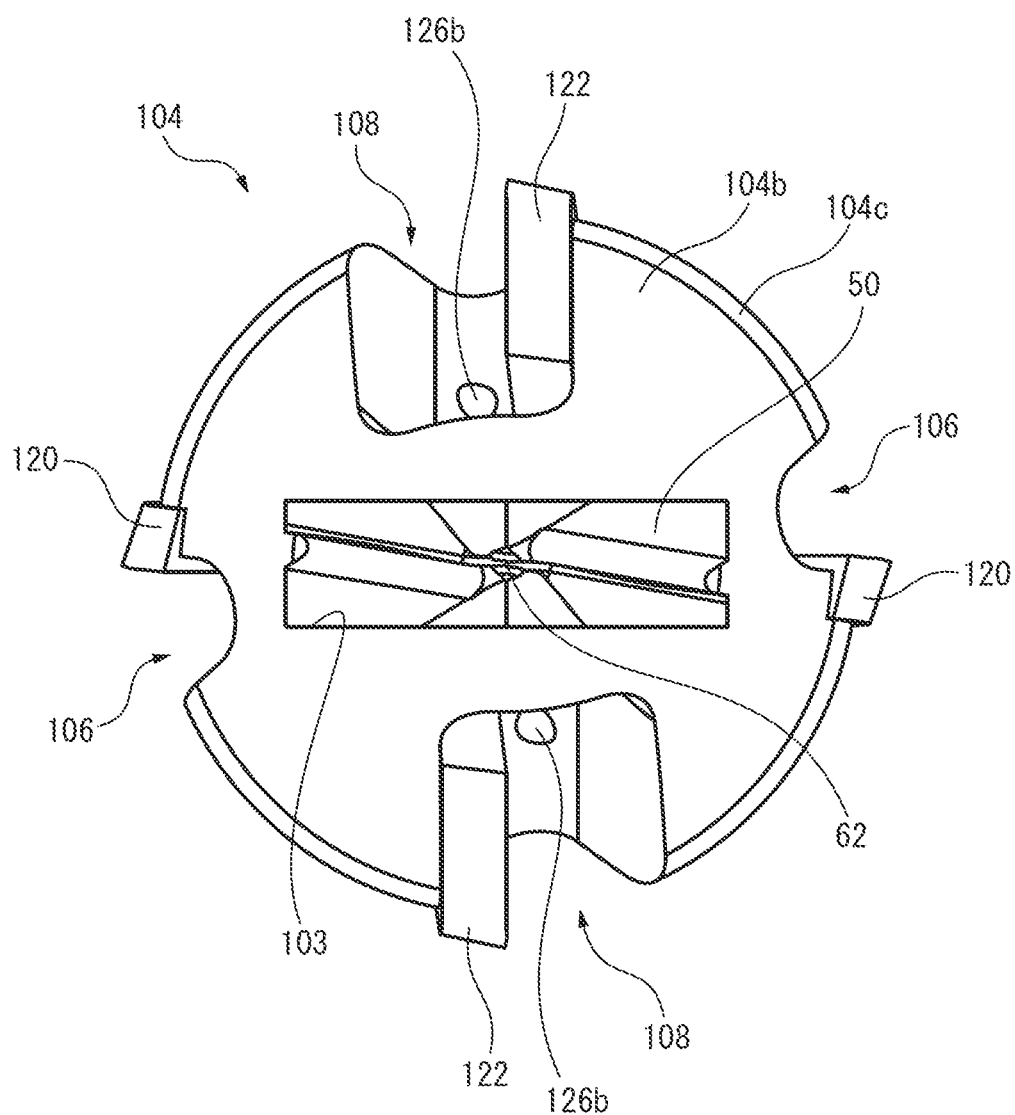
FIG. 31 is a bottom view of the milling tool of FIG. 28 as viewed from the head side.
Figure 32:
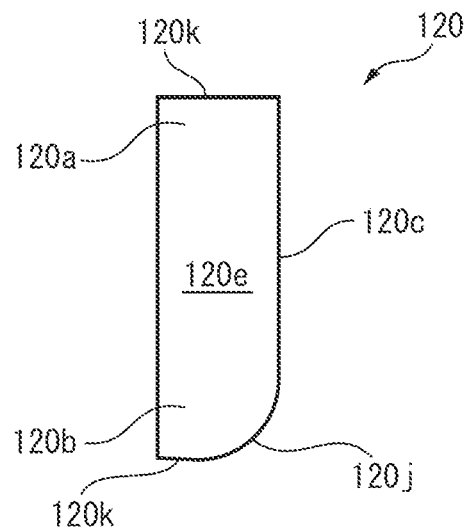
FIG. 32 is a front view of an upper insert used in the milling tool of FIG. 28.
Figure 33:
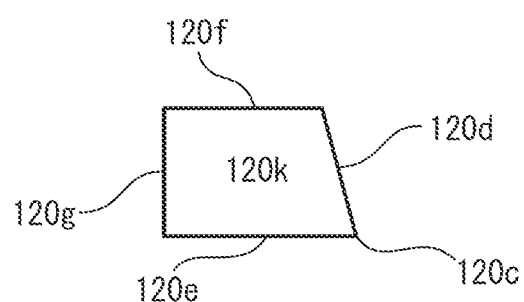
FIG. 33 is a bottom view of the upper insert of FIG. 32.
Figure 34:
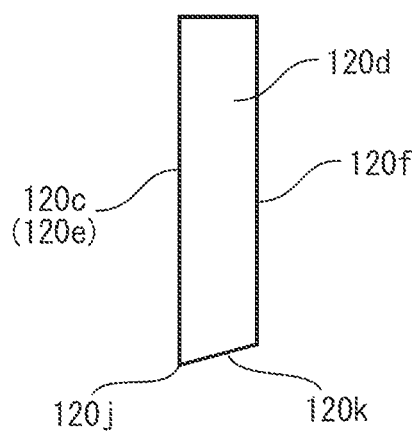
FIG. 34 is a side view of the upper insert of FIG. 32.
Figure 35:
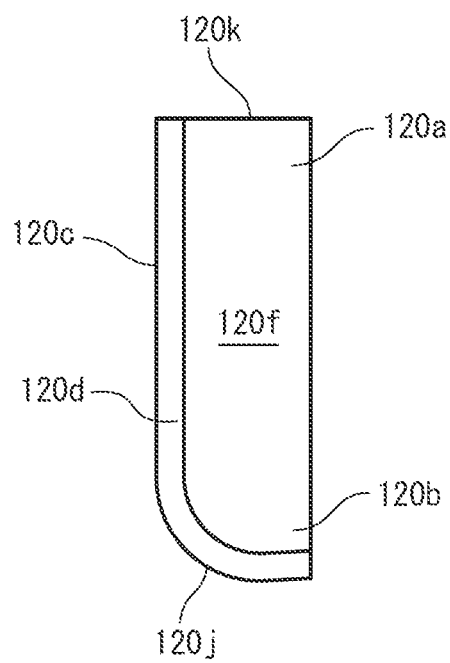
FIG. 35 is a rear view of the upper insert of FIG. 32.
Figure 36:
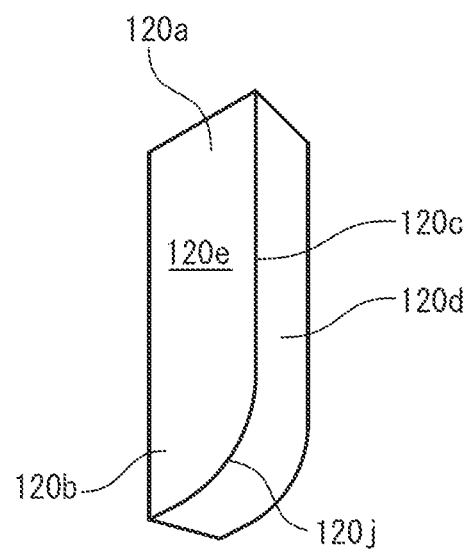
FIG. 36 is a perspective view of the upper insert of FIG. 32.
Figure 37:
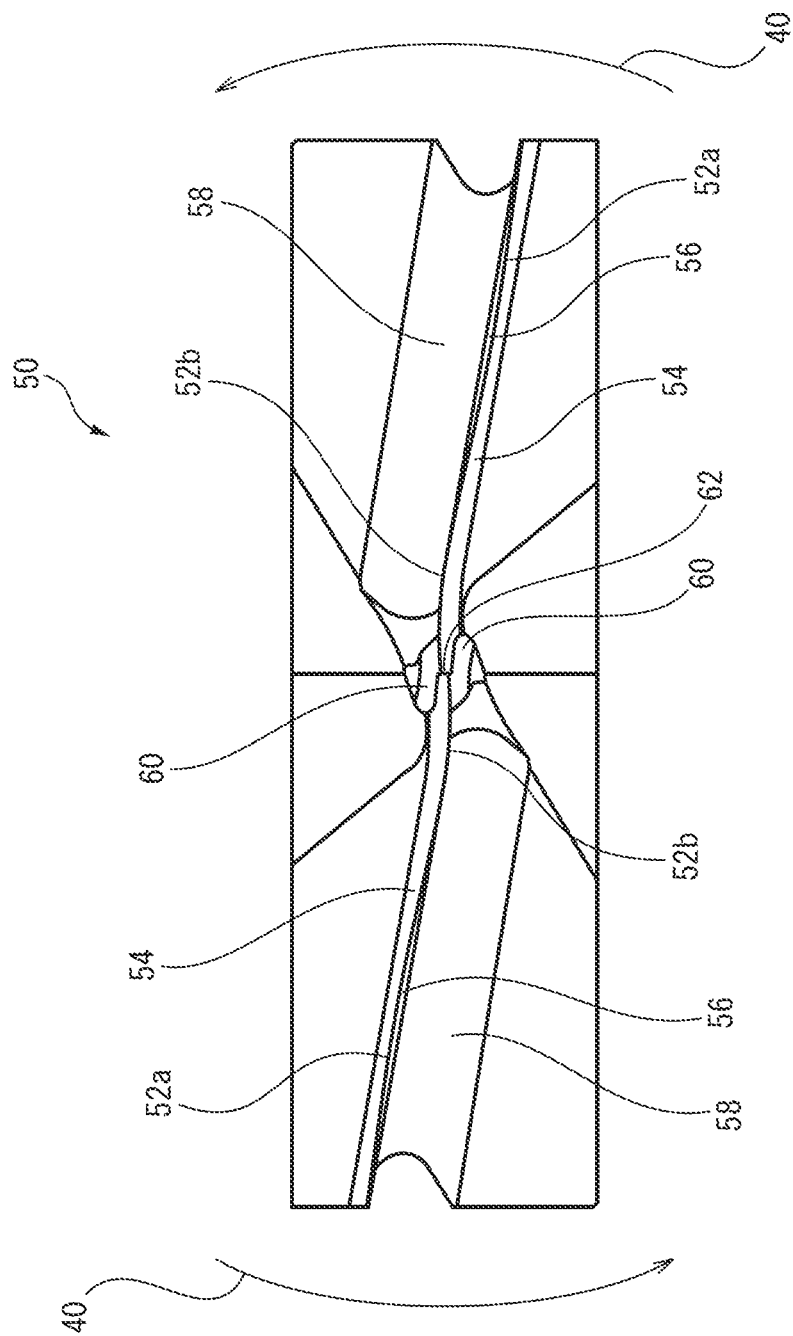
FIG. 37 is a front view of a tip end insert used in the milling tool of FIG. 28.

Referring to FIGS. 29 and 30, the upper inserts 120 are attached to the upper seats so that the first cutting edges 120c of all upper inserts 120 rotate along one conical surface when the milling tool 100 rotates about the central axis O. Likewise, the lower inserts 122 are attached to the lower seats so that the first cutting edges 122c of all lower inserts 122 rotate along one conical surface when the milling tool 100 rotates about the central axis O.

Figure 28:
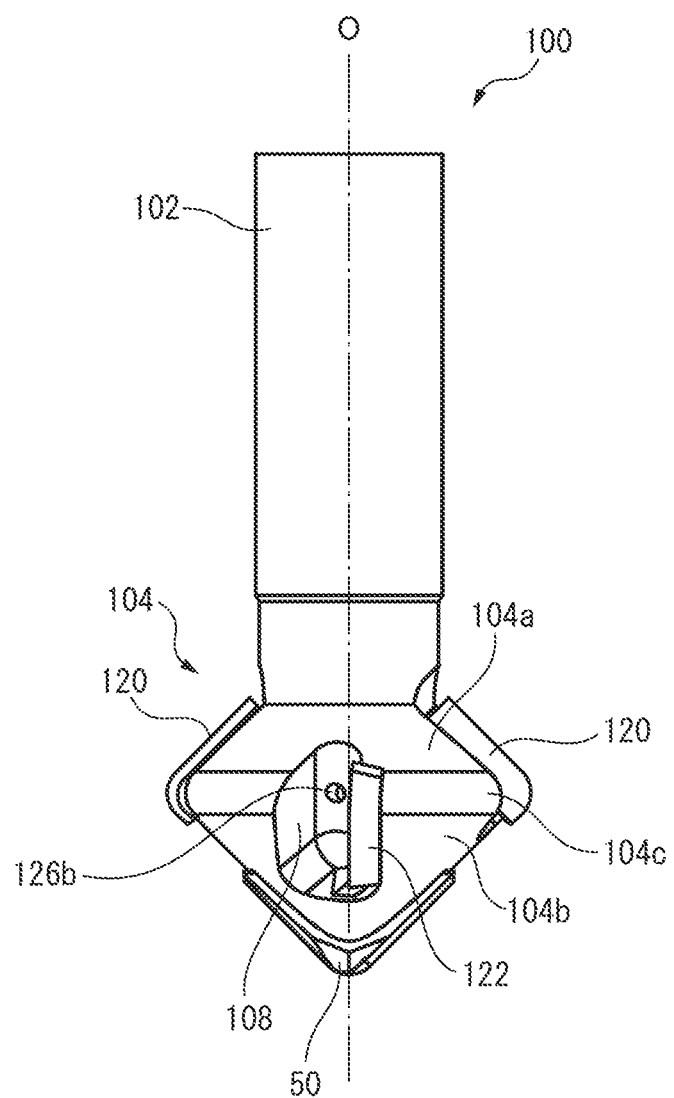
FIG. 28 is a front view of a milling tool according to a second embodiment of the present invention.
Figure 38:
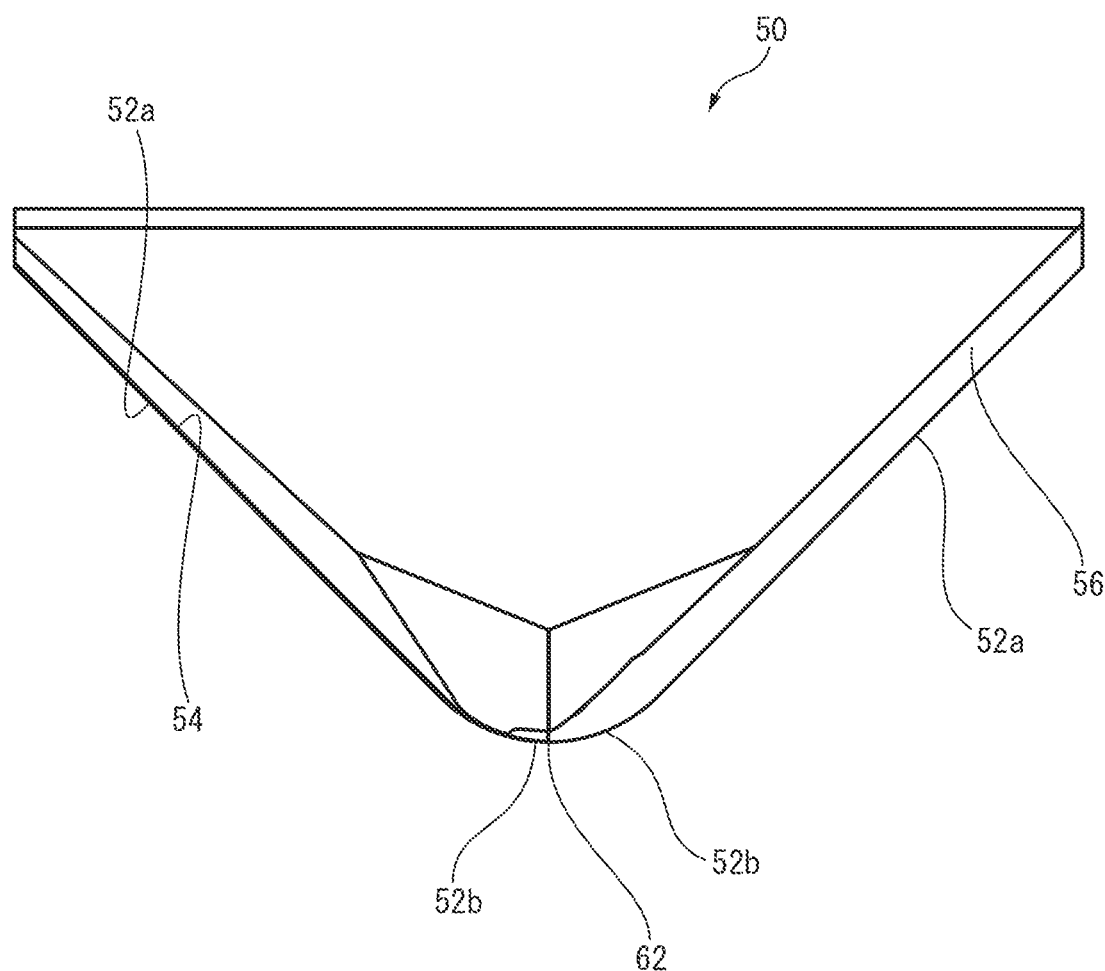
FIG. 38 is a perspective view of the tip end insert of FIG. 37 as viewed from the tip end side.
Figure 39:
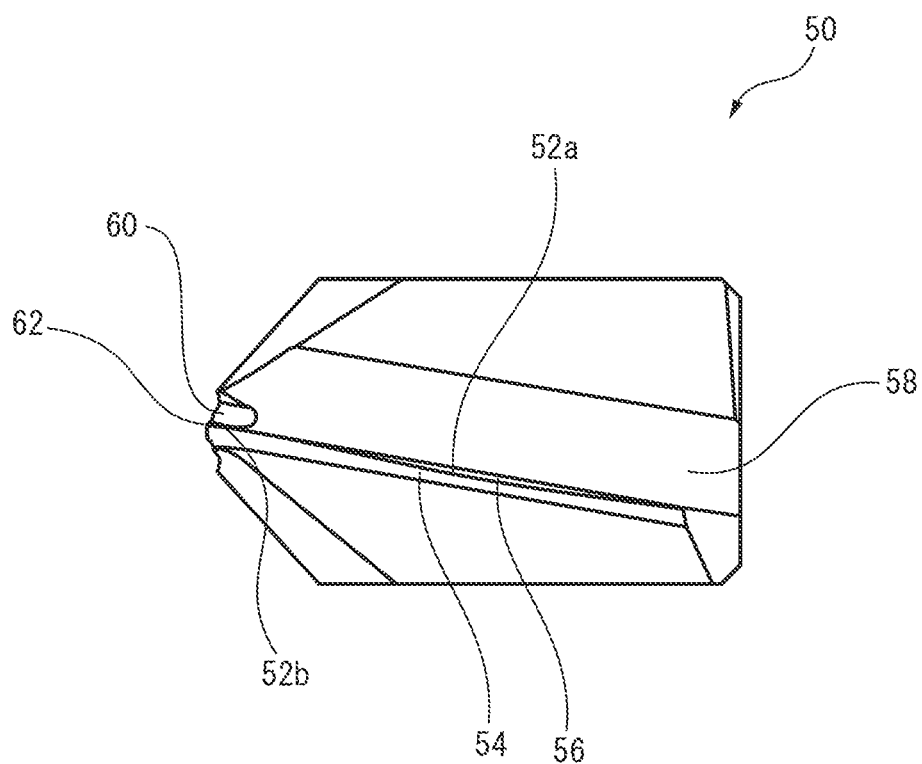
FIG. 39 is a side view of the tip end insert of FIG. 37.
Figure 40:
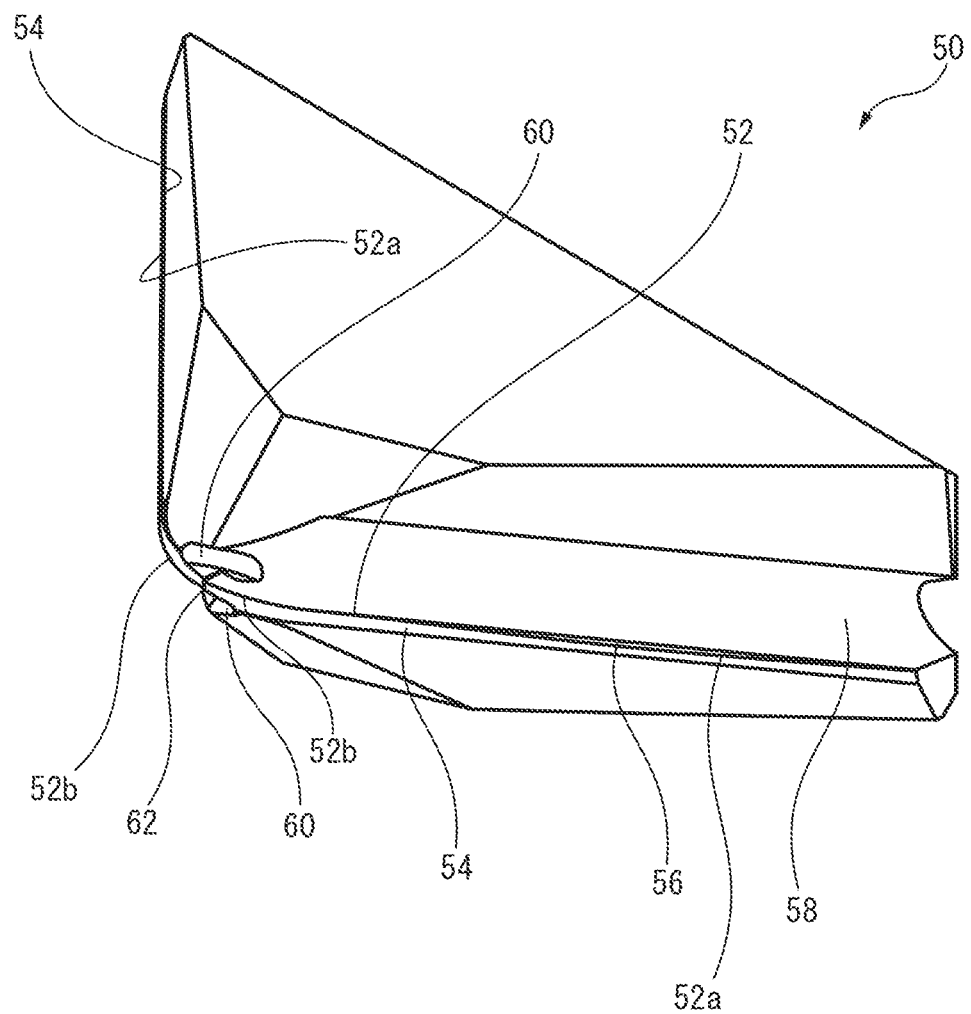
FIG. 40 is a perspective view of the tip end insert of FIG. 37 as viewed from another angle.

As shown in FIG. 38, the tip end insert 50 is formed in a substantially triangular plate shape having a vertex 62 in a plan view (the side surface view of the milling tool 100 in FIG. 28). The tip end insert 50 has two cutting edges extending linearly from the vertex 62 along two sides of the triangle. The two cutting edges each include a main cutting edge 52a extending substantially linearly, and an arcuate secondary cutting edge 52b provided between the vertex 62 and the main cutting edge 52a in a plan view (the side surface view of the milling tool 100 in FIG. 28). Each of the two sets of cutting edges 52a and 52b is formed by the line of intersection of the rake face 56 and the flank face 54.

When the tip end insert 50, which rotates in the direction of arrow 40, is viewed from the tip end side, one of the two rake faces 56 (the rake face on the right side in FIG. 37) is arranged on the upper side of the cutting edges 52a, 52b formed by the rake face, and the other rake face 56 (the rake face on the left side in FIG. 37) is arranged on the lower side of the cutting edges 52a, 52b formed by the rake face. Thus, the two rake faces 36 are formed so as to face in the same direction with respect to the direction of rotation of the milling tool 10. Furthermore, when the tip end insert is viewed from the tip end side, one of the two flank faces 54 (the flank face on the right side in FIG. 37) is arranged on the lower side of the cutting edges 52a, 52b formed by the flank face, and the other flank face 54 (the flank face on the left side in FIG. 37) is arranged on the upper side of the cutting edges 52a, 52b formed by the flank face.

Furthermore, the two linear main cutting edges 52a extend parallel to each other and do not intersect at vertex 62. Each of the two arcuate secondary cutting edges 52b is formed so as to adjoin the linear main cutting edges 52a. The two arcuate secondary cutting edges 52b are formed so as to trace a common sphere in the vicinity of the vertex 62 when the milling tool 100 rotates about the central axis O. Specifically, in a plan view of the tip end insert 50, the two secondary cutting edges 52b are arranged on a common arc.

The tip end insert 50 has one swarf discharge groove 58 provided adjacent to each of the main cutting edges 52a. The tip end insert 50 also has two clearance grooves 60 provided in the vicinity of the vertex 62. The two secondary cutting edges 52b are arranged between the two clearance grooves 60.

As shown in FIGS. 28 and 29, the tip end insert 50 is attached in the tip end groove 103 formed in the tip end section of the head 104 so that the vertex 62 is arranged on the central axis O of the milling tool 100. Further, the two main cutting edges 52a of the tip end insert 50 are attached in the tip end groove 103 of the head 104 so as to rotate along the conical surface traced by the first cutting edge 122c of the lower insert 122 when the milling tool 100 rotates about the central axis O. Specifically, the angle between the two main cutting edges 52a interposing the vertex 62 of the tip end insert 50 is equal to the angle between the two generatrices where the plane containing the central axis of the conical surface (central axis O of the milling tool 100) traced by the first cutting edges 122c of the two lower inserts 122 intersects the conical surface.

In the illustrated embodiment, the two conical surfaces traced by the first cutting edges 120c, 122c of the upper inserts 120 and the lower inserts 122 when the milling tool 100 rotates are symmetrical with respect to the plane defined by the line of intersection between the two conical surfaces, but they may be asymmetric depending on the target machining process or workpiece shape. Furthermore, the lines of intersection (the generatrix of each conical surface) of the two conical surfaces described above with the plane containing the central axis O intersect at a predetermined angle. This angle can be any of various values depending on the target machining process. The angle formed by the two lines of intersection described above can be, for example, an angle which matches the angle between the rib, which is described later, and the return flange overhanging from the top of the rib, and is preferably an angle which is 90° or less than 90°. Furthermore, the first cutting edge 120c of the upper insert 120 is formed so as to be longer than the overhang dimension (width) of the return flange described above.

Further, the upper insert 120 and the lower insert 122 are attached to the upper seat and the lower seat so that the second cutting edges 120j, 122j move along a rotating body shape which is a locus when one arc which protrudes in the radial direction of the head 104 rotates about the central axis O of the milling tool 100 when the milling tool 100 rotates about the central axis O. This rotating body shape can be inscribed in both of the two conical surfaces traced by the first cutting edges 120c, 122c of the upper insert 120 and the lower insert 122 when the milling tool 100 rotates.

Furthermore, the shank 102 and the head 104 can be integrally formed using tool steel, and the upper inserts 120, the lower inserts 122, and the tip end insert 50 can be attached to the upper seats and the lower seats of the head 104 using a suitable joining technique such as brazing. The upper inserts 120, the lower inserts 122, and the tip end insert 50 may be affixed to the head 104 using set screws (not illustrated).

After the upper insert 120, the lower insert 122, and the tip end insert 50 have been attached, the upper insert 120, the lower insert 122, and the tip end insert 50 are subjected to grinding, so that the two first cutting edges 120c of the upper insert 20 trace the same conical surface, and the two first cutting edges 122c of the lower insert 122 and the two cutting edges 32 of the tip end insert 30 trace the same conical surface. Furthermore, the generatrix of each of the two conical surfaces traced by the first cutting edge 120c of the upper insert 120 and the first cutting edge 122c of the lower insert 122 described above assume an angle which matches the angle between the rib of the workpiece and the return flange protruding from the upper end of the rib, and the rotating body shape traced by the second cutting edges 120j, 122j can be inscribed in both of the two conical surfaces.

The milling tool 100 can perform machining of a rib having a return flange by the same procedure as the milling tool 10 described with reference to FIGS. 16 to 27. Though the milling tool 10 is suitable for machining corners not including the corner R, as described above, the milling tool 100 is suitable for machining corners including the corner R, as shown in FIG. 41.

Figure 41:
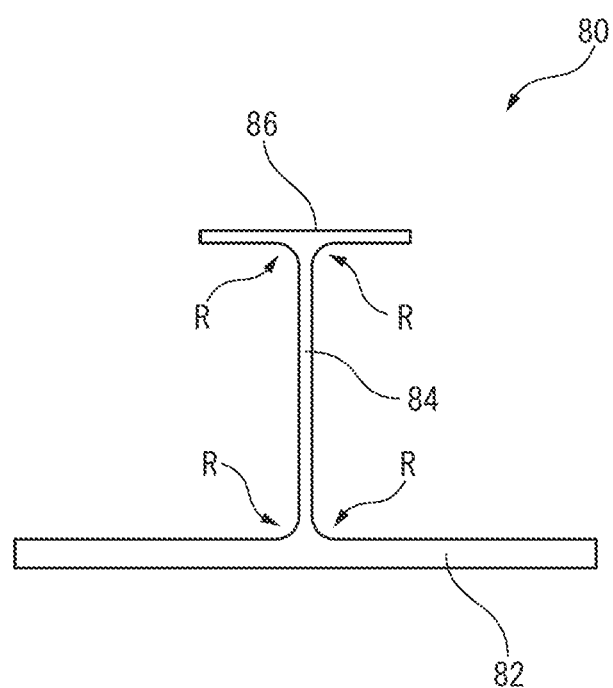
FIG. 41 is an end view showing an example of a workpiece having a return flange machined with the milling tool of FIG. 28, which has corners R between the bottom wall and the rib and the rib and the return flange.
Figure 42:
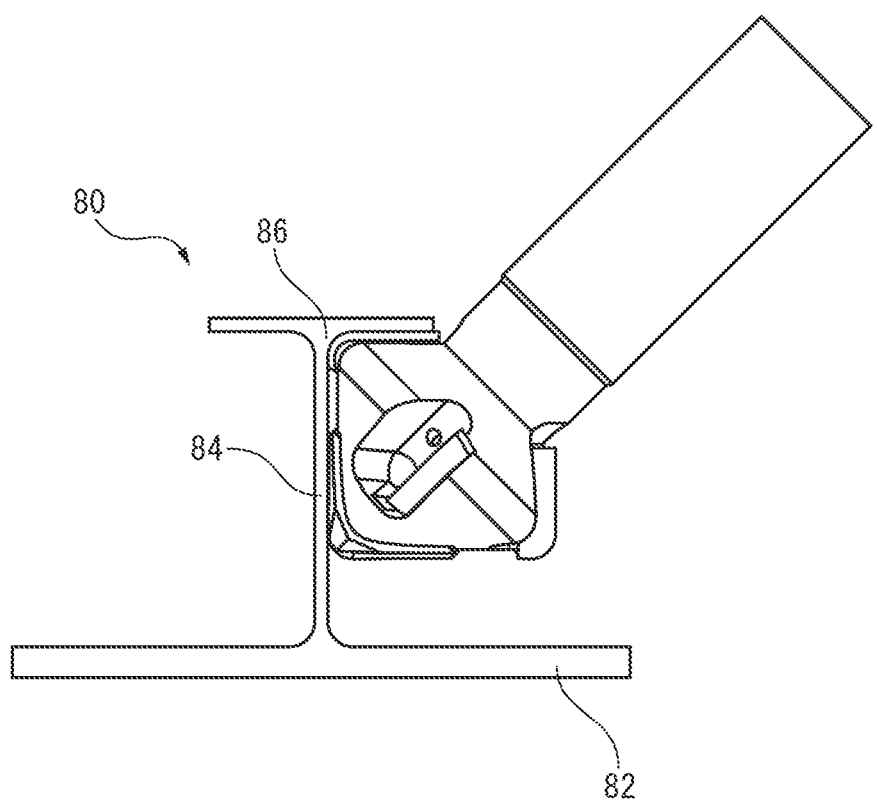
FIG. 42 is a schematic diagram detailing the machining of the corners R of the workpiece of FIG. 41 with the milling tool according to the second embodiment.
Figure 43:
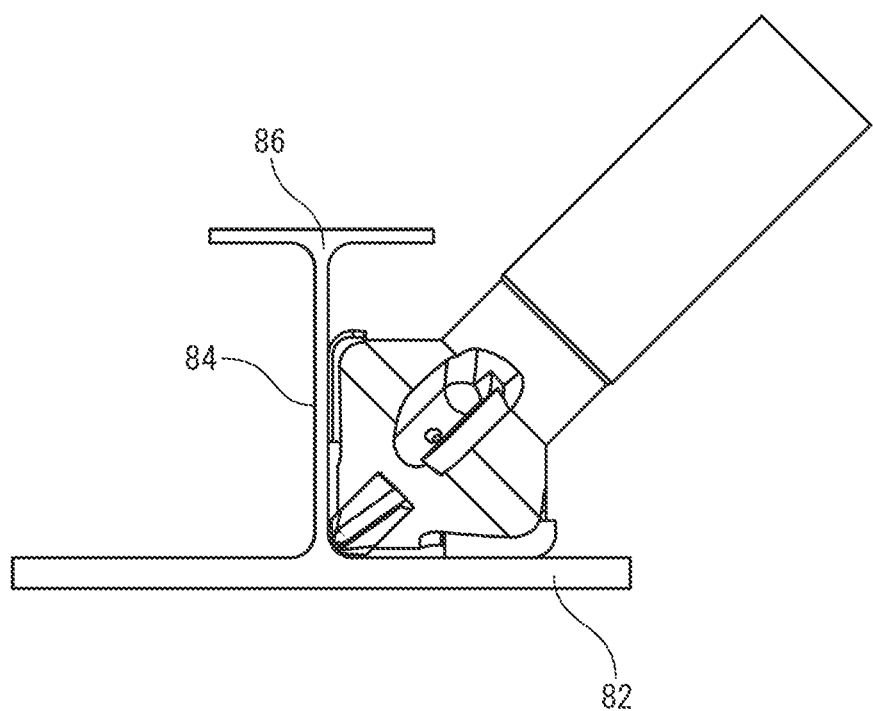
FIG. 43 is a schematic diagram detailing the machining of the corners R of the workpiece of FIG. 41 with the milling tool according to the second embodiment.

In FIG. 41, the workpiece 80 has a bottom wall 82, a rib 84 forming a thin wall extending vertically from the bottom wall 82, and a return flange 86 protruding from the upper end of the rib 84 to both sides substantially in parallel to the bottom wall 82. The corners between the bottom wall 82 and the rib 84 and the corners between the rib 84 and the return flange 86 become corners R.

In the present embodiment, the corners R between the bottom wall 82 and the rib 84 are machined by the secondary cutting edges 52b of the tip end insert 50, and the corners R between the rib 84 and the return flange 86 are machined by the second cutting edges 120j, 122j of the upper inserts 120 and the lower inserts 122.

Next, a third embodiment of the present invention will be described with reference to FIGS. 44 to 47.

Figure 44:
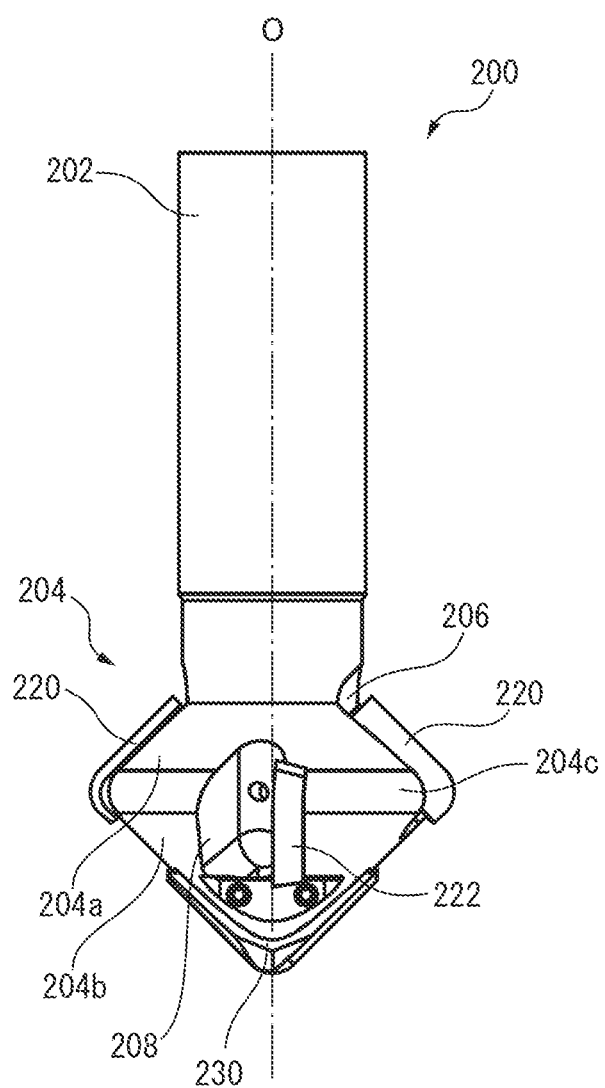
FIG. 44 is a front view of a milling tool according to a third embodiment of the present invention.
Figure 45:
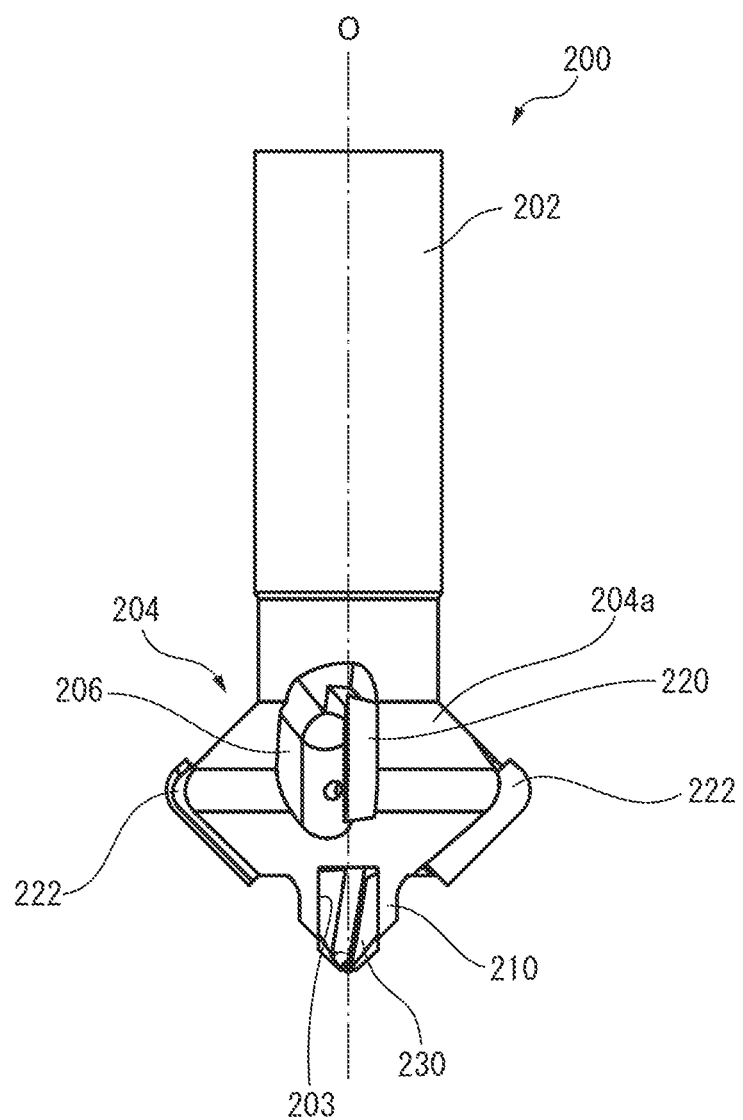
FIG. 45 is a side view of the milling tool as viewed from a direction differing by 90° from FIG. 44.
Figure 46:
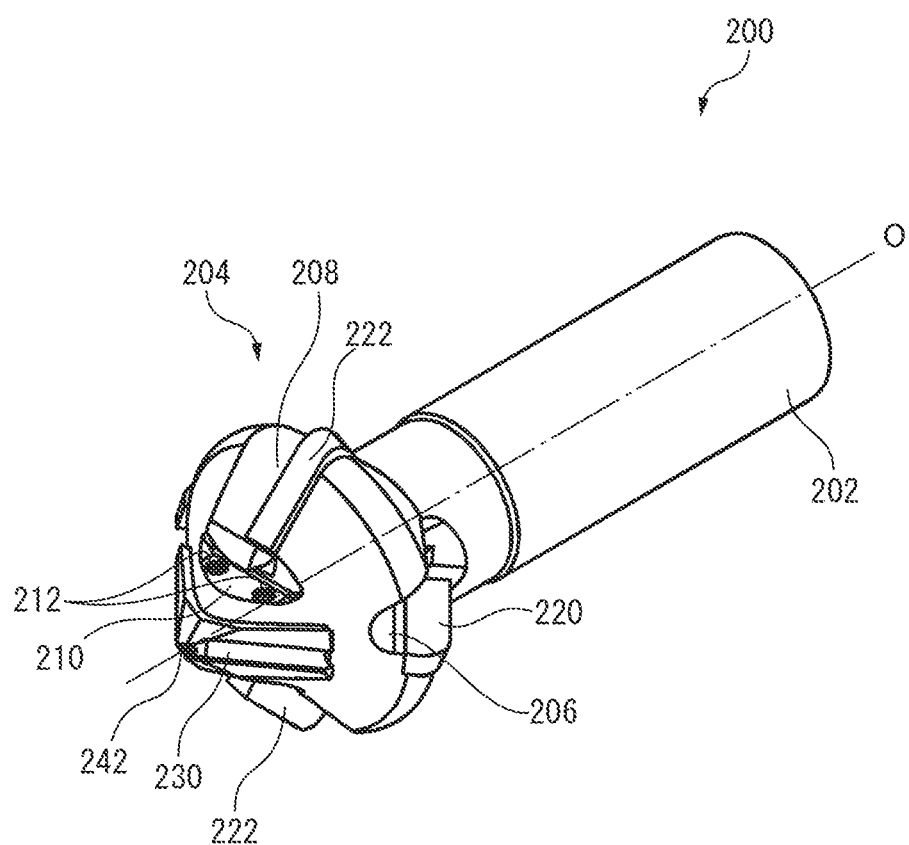
FIG. 46 is a perspective view of the milling tool of FIG. 44.

Referring to FIGS. 44 to 46, the milling tool 200 according to the third embodiment is configured in substantially the same manner as the milling tool 100 according to the second embodiment, and comprises a cylindrical shank 202 and a head 204 integrally formed on the tip end of the shank 202. The head 204 has a substantially frustoconical expanding diameter section 204a which increases in diameter from a base end side adjoining the shank 202 in the tip end direction, and a substantially frustoconical contracting diameter section 204b which decreases in diameter from the expanding diameter section 204a in the tip end direction, and the head 204 is formed in a substantially two-sided conical shape.

A transition section 204c as a maximum diameter section, in which the diameter is maximum, is formed between the expanding diameter section 204a and the contracting diameter section 204b. The head 204 has upper grooves 206 formed in the expanding diameter section 204a, lower grooves 208 formed in the contracting diameter section 204b, and a tip end groove 203 for attachment of a tip end insert 230. The upper grooves 206 and lower grooves 208 are alternately arranged at equal angles about the central axis O of the head 204. In the illustrated embodiment, the head 204 has two upper grooves 206 and two lower grooves 208.

The upper grooves 206 and lower grooves 208 are arranged at equal angles about the central axis O of the head 204. In the illustrated embodiment, the head 204 has two upper grooves 206 and two lower grooves 208. Note that though the upper grooves 206 and lower grooves 208 are arranged at equal angles in the present embodiment, they may be arranged at non-equal angles in order to prevent chatter. An upper insert 220 is attached in each upper groove 206, and a lower insert 222 is attached in each lower groove 208. The upper inserts 220 and lower inserts 222 are identical to the upper inserts 120 and lower inserts 122 of the second embodiment.

Figure 47:
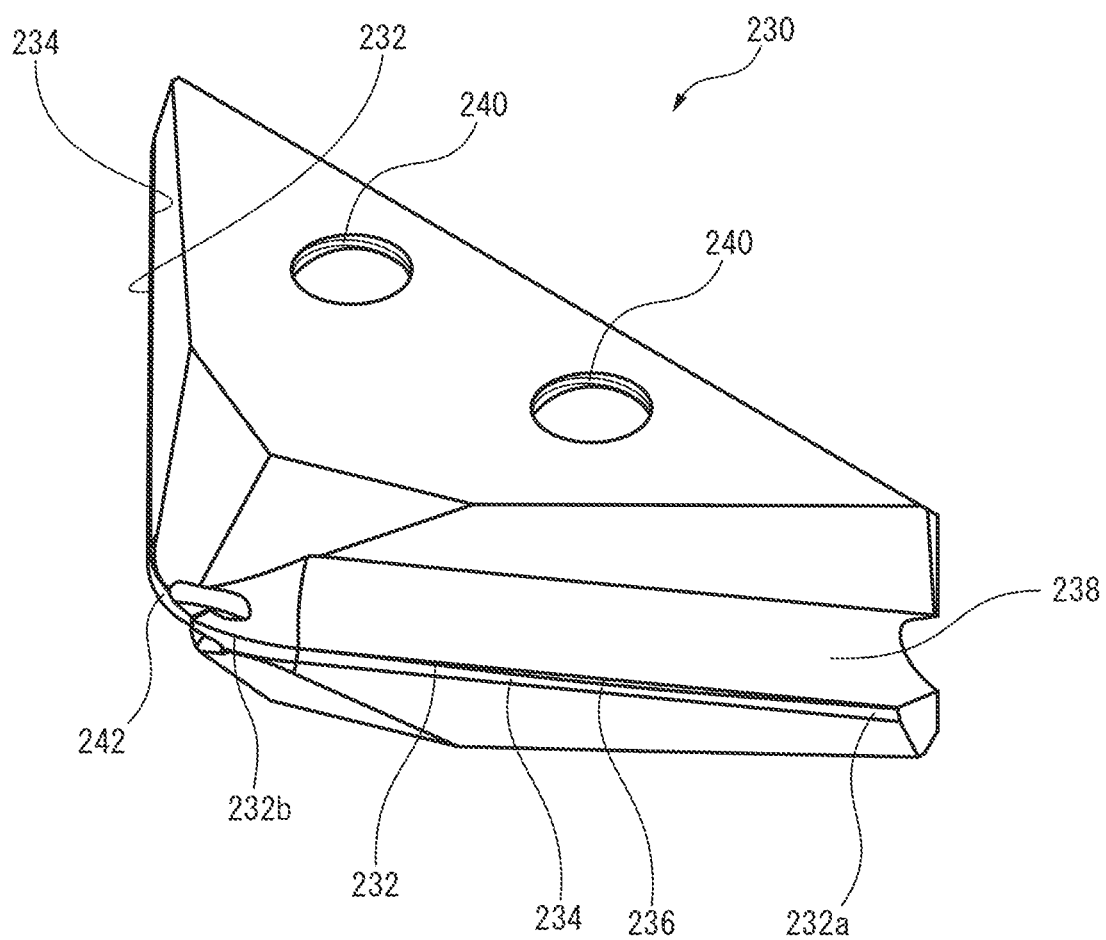
FIG. 47 is a perspective view of a tip end insert used in the milling tool of FIG. 44.

As shown in FIG. 47, the tip end insert 230 is formed in a substantially triangular plate shape having a vertex 242. The tip end insert 230 has two cutting edges extending linearly from the vertex 242 along two sides of the triangle. The two cutting edges each include a first cutting edge 232a extending substantially linearly, and an arcuate second cutting edge 232b provided between the vertex 242 and the first cutting edge 232a in a plan view (the side surface view of the milling tool 200 in FIG. 44). Each of the two sets of cutting edges 232a and 232b is formed by the line of intersection of a rake face 236 and a flank face 234.

In the present embodiment, the tip end insert 230 is affixed to the head 204 with set screws 212. To this end, the head 204 has a notch 210 in the tip end section thereof. Threaded holes (not illustrated) for threading of the set screws 212 are formed in the notch 210, and the tip end insert 230 has recesses 240 similar to the tip end shape of the set screws 212.

Note that in the embodiments described above, regarding the milling tools 10, 100, and 200, though there are provided two upper inserts 20, 120, 220 and two lower inserts 22, 122, 222, and there is provided one tip end insert 30, 50, 230, the present invention is not limited thereto, and at least one upper insert and at least one lower insert may be provided. Furthermore, the present invention may be applied to an insert tool or a solid tool with cutting edges in which the respective roles of the main cutting edges of the upper inserts, the secondary cutting edges in the vicinity of the maximum diameter, the main cutting edges of the lower insert, the main cutting edges of the tip end insert, and the tip end cutting edge are split or integrated.

DESCRIPTION OF REFERENCE SIGNS

10 Milling Tool
12 Shank
14 Head
14a Expanding Diameter Section
14b Contracting Diameter Section
14c Transition Section
20 Upper Insert
20c First Cutting Edge
20j Second Cutting Edge
22 Lower Insert
22c First Cutting Edge
22j Second Cutting Edge
30 Tip End Insert
32a First Cutting Edge
38 Vertex
70 Workpiece
72 Bottom Wall
74 Rib
76 Return Flange

The invention claimed is:
1. A milling tool comprising a shank section and a head which is provided on a tip end side of the shank section and which has a cutting edge, wherein
the head has an expanding diameter section which gradually increases in diameter from a base end portion adjoining the shank section in a tip end direction, and a contracting diameter section which gradually decreases in diameter from a maximum diameter section in the tip end direction, and the milling tool comprises:
- at least one cutting edge provided on the expanding diameter section and at least one cutting edge provided on the contracting diameter section, and
- at least one tip end cutting edge which extends from the contracting diameter section to a center axis of the milling tool in a tip end section of the head,
- the cutting edge of the expanding diameter section is formed on an upper insert attached to the expanding diameter section and the cutting edge of the contracting diameter section is formed on a lower insert attached to the contracting diameter section,
- each of the upper insert and the lower insert has a first cutting edge linearly extending from one end thereof, and
- a tip end insert having a linear main cutting edge along a conical surface defined by a path of the first cutting edge of the lower insert when the milling tool rotates.

2. The milling tool according to claim 1, wherein the upper insert and the lower insert each further have a second cutting edge which is connected to the first cutting edge and which is curved in a convex shape arranged at the other end of the upper insert or the lower insert, the upper insert and the lower insert are arranged so that the respective second cutting edges are adjacent to a joint of the expanding diameter section and the contracting diameter section, and the tip end insert has a linear main cutting edge along the conical surface traced by the first cutting edge of the lower insert when the milling tool rotates.

3. The milling tool according to claim 2, wherein the tip end insert further comprises an arcuate secondary cutting edge which is connected to a tip end central section so as to adjoin the main cutting edge.

* * * * *